United States Patent
Venkideswaran et al.

(10) Patent No.: US 11,119,548 B2
(45) Date of Patent: Sep. 14, 2021

(54) DYNAMIC POWER THROTTLING BASED ON SYSTEM CONDITIONS IN USB TYPE-C POWER DELIVERY (USB-C/PD) ECOSYSTEM

(71) Applicant: Cypress Semiconductor Corporation, San Jose, CA (US)

(72) Inventors: Ajay Venkideswaran, Bangalore (IN); Debraj Bhattacharjee, Bengaluru (IN); Kailas Iyer, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/825,803

(22) Filed: Mar. 20, 2020

(65) Prior Publication Data
US 2021/0208648 A1    Jul. 8, 2021

Related U.S. Application Data

(60) Provisional application No. 62/958,535, filed on Jan. 8, 2020.

(51) Int. Cl.
*G06F 1/26*      (2006.01)
*H02J 7/02*      (2016.01)

(52) U.S. Cl.
CPC .............. *G06F 1/26* (2013.01); *H02J 7/02* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 7,793,125 B2 | 9/2010 | Berry, Jr. et al. | |
| 9,274,574 B2 | 3/2016 | Conroy et al. | |
| 9,760,141 B2 | 9/2017 | Sultenfuss et al. | |
| 10,152,104 B2 | 12/2018 | Waters | |
| 10,275,381 B2 | 4/2019 | Chen et al. | |
| 2014/0059363 A1* | 2/2014 | Shao | G06F 13/385 |
| | | | 713/300 |
| 2014/0325245 A1 | 10/2014 | Santini et al. | |
| 2017/0139467 A1 | 5/2017 | Waters et al. | |
| 2017/0366091 A1* | 12/2017 | Langeslag | H02M 1/08 |
| 2018/0067530 A1* | 3/2018 | Hsieh | G06F 13/4282 |
| 2018/0146526 A1* | 5/2018 | Creusen | H05B 45/14 |
| 2018/0232021 A1* | 8/2018 | Perchlik | G06F 13/385 |

(Continued)

FOREIGN PATENT DOCUMENTS

WO     2019156659 A1     8/2019

OTHER PUBLICATIONS

STM32 USB Type-C Port Manager, STMicroelectronics, 14 pages. https://www.st.com/content/ccc/resource/sales_and_marketing/presentation/product_presentation/group0/38/5e/db/ee/e7/be/44/f1/usb_type-c/files/usb_type-c.pdf/jcr:content/translations/en.usb_type-c.pdf.

*Primary Examiner* — Danny Chan
(74) *Attorney, Agent, or Firm* — Lowenstein Sandler LLP

(57) ABSTRACT

Technology to dynamically throttle power in a power delivery system is described. In one embodiment, a power delivery system includes a controller associated with a port to supply power. The controller manages a power budget available to the port based on a current state of one or more system parameters. The power budget available to the port can be throttled when the power delivery system operates under stress conditions and adjusted when the power delivery system is no longer operating under stress conditions.

21 Claims, 15 Drawing Sheets

(56) References Cited

U.S. PATENT DOCUMENTS

| | | |
|---|---|---|
| 2018/0314309 A1 | 11/2018 | Lyu |
| 2018/0358821 A1* | 12/2018 | Li .................... H02J 7/0047 |
| 2019/0004584 A1 | 1/2019 | Nge et al. |
| 2019/0171268 A1 | 6/2019 | Ellis et al. |
| 2019/0317581 A1* | 10/2019 | Elghrawi ............ H02J 7/1446 |
| 2019/0332558 A1 | 10/2019 | Goel |
| 2019/0391628 A1* | 12/2019 | Camiolo ............ H01R 24/62 |
| 2020/0117258 A1* | 4/2020 | Ichikawa ............ H02J 7/00 |

\* cited by examiner

DYNAMIC POWER THROTTLING BASED ON SYSTEM CONDITIONS IN USB TYPE-C POWER DELIVERY (USB-C/PD) ECOSYSTEM

RELATED APPLICATIONS

This application claims the benefit of U.S. Provisional Application No. 62/958,535, filed Jan. 8, 2020, the entire contents of which are incorporated by reference.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents.

BRIEF DESCRIPTION OF THE DRAWINGS

The disclosure is illustrated by way of example, and not of limitation, in the figures of the accompanying drawings.

DETAILED DESCRIPTION

Figure 1:
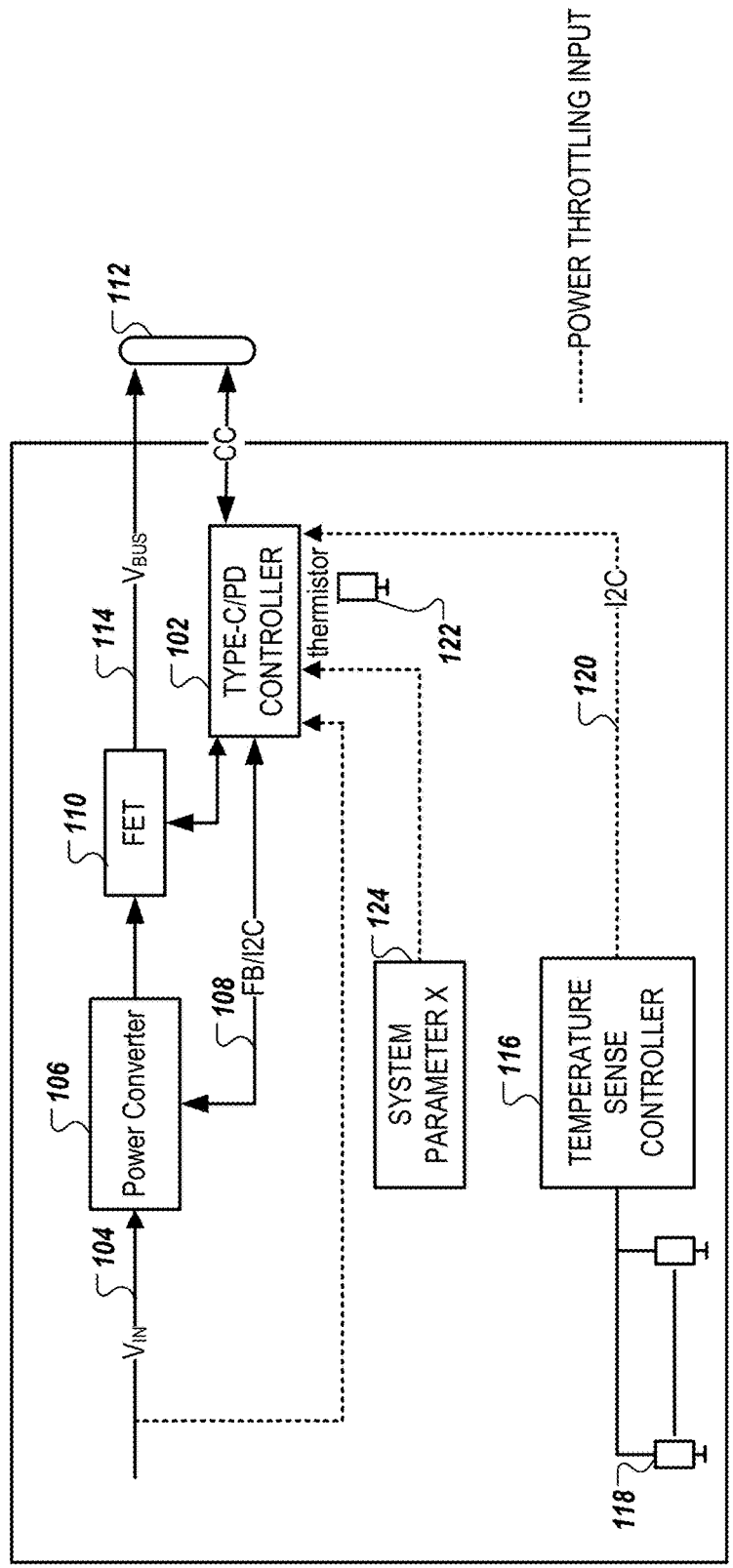
FIG. 1 is a block diagram of a USB Type-C power delivery (USB-C/PD) system that performs dynamic power throttling according to one embodiment.

The following description sets forth numerous specific details such as examples of specific systems, components, methods, and so forth, in order to provide a good understanding of various embodiments of the techniques described herein for enabling dynamic power throttling based on system conditions in a USB Type-C/PD ecosystem. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for dynamic power throttling based on system conditions in a USB Type-C/PD ecosystem. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for direct current to direct current (DC-to-DC) power adapters, alternating current to direct current (AC-to-DC) power adapters, GaN based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability. These embodiments can help enable a power source to be of much lower capacity, thereby reducing cost and complexity, while continuing to efficiently employ the maximum charging potential of underlying USB Type-C/PD ports.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX−lines, among others. In addition, a Type-C port also provides a Sideband Use (denoted SBU) line for signaling of sideband functionality and a Configuration Channel (denoted CC) line for discovery, configuration, and management of connections across a Type-C cable.

A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D−lines (DN1 and DN2), two SSTX+ lines (SSTXP1 and SSTXP2), two SSTX−lines (SSTXN1 and SSTXN2), two SSRX+ lines (SSRXP1 and SSRXP2), two SSRX−lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

In one embodiment, a USB-PD power source can be configured to draw power from a direct current (DC) power source, and can include a direct current-to-direct current (DC-DC) converter. In other embodiments, a USB-PD power source may be configured to draw power from an alternating current (AC) power adapter or from another AC source. Thus, as part of an AC-DC conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

In a USB Type-C/PD system, supplying full port power under stress conditions may lead to inefficient operation, damage to the port, and/or a blown fuse, which may lead to a malfunctioning of the system. Power throttling solutions help protect the system from malfunctioning due to operating under stress conditions. One power throttling technique uses an external controller to measure a temperature and an input voltage of the system. Power levels corresponding to the measured temperature and input level are determined and a corresponding power budget value is communicated to the PD controllers via a serial communication interface (such as an I2C interface). The technique requires a dedicated external controller to sense and trigger necessary power changes. Since the controller is external, it may not allow for dynamic configuration of power levels. Further the external controller may have no mechanism for handling erroneous or spurious data and an algorithm of the technique does not incorporate hysteresis.

Described herein are various embodiments of techniques for dynamic power throttling based on system conditions in a USB Type-C/PD ecosystem. The embodiments described herein may address the above-mentioned and other challenges by providing a dynamic power throttling mechanism by which the USB Type-C/PD controller is able to manage a power budget available to a port based on a current state of system parameters. The algorithm ensures that the system and port do not continue to operate at full power under system stress. System stress can be induced by an increase in temperature, a low input voltage, or the like. Under stress conditions, a port power of the port can be temporarily dropped to a lower value if any other system level task requires more power. For example, if a system level task has a high power requirement, the power to the port can be throttled to a lower power level so that a device connected to the port can continue to charge or operate but at a lower power. Once the system level task is completed, the power can be throttled back to the required level of the device.

The embodiments do not depend on an external controller for the power throttling task, which can make the USB Type-C/PD controller resilient to communication failures. The OCs (or operating condition levels) define the power levels. The embodiments do not make any assumptions on the power levels corresponding to each operating condition (OC) level. The OCs (or operating condition levels) define the power levels. The operating condition levels are configurable and can be updated or set as per system requirements. The power levels can be preconfigured or can by dynamically configured to meet an end-user's needs. The embodiments can provide a built-in debounce logic to consider multiple samples of a system parameter value before determining the operating condition corresponding to the system parameter to ensure that a faulty reading does not result in power throttling to a wrong operating condition level. The embodiments can provide a built-in hysteresis logic to ensure that swinging values in the threshold range do not trigger an incorrect operating condition change. The embodiments can provide for an algorithm that monitors a state of the system parameters in a periodic manner without affecting functionality of the system. The embodiment can provide an algorithm that is an improved mechanism for handling system parameter faults. If any parameter reads a fault value, the operating condition corresponding to that system parameter is set to the most critical operating condition defined for it. The embodiments and techniques described herein are compatible with multiple system parameters (e.g., system stimuli), such as an input voltage, a battery voltage, an output voltage, a cable loss metric, humidity, or other parameter that can be measured. The embodiments and techniques described herein can cause a system to be resilient to noise (e.g., random fluctuations) in measurements or readings of system parameters.

FIG. 1 is a block diagram of a USB Type-C power delivery (USB-C/PD) system 100 that performs dynamic power throttling according to one embodiment. A firmware algorithm can enable USB-C/PD system 100 to perform dynamic power throttling by managing a power budget available to port 112 based on a current state or value of system parameters. In one embodiment, USB controller 102 executes the firmware algorithm that performs dynamic power throttling. In another embodiment, USB controller 102 has embedded code or logic and is configured to execute instructions to perform dynamic power throttling. In another embodiment, USB controller 102 implements the functionality in one or more circuits. In one embodiment, USB-C/PD system 100 reduces the power budget available to the port from a maximum value to a lower value when USB-C/PD system 100 is operating under a stress condition, such as high temperature, low input voltage, or the like. In another embodiment, USB-C/PD system 100 increases the power budget available to the port from a lower value to a higher value when the stress condition is reduced. In one embodiment, USB controller 102 is a USB port controller to control a USB port.

USB controller 102 is operatively coupled to port 112. To perform dynamic power throttling, USB controller 102 obtains data for a number of system parameters of USB-C/PD system 100. In one embodiment, the data is a measurement of a system parameter. In another embodiment, the data is a state of a system parameter. USB-C/PD system 100 has an input voltage VIN from a power source at input line 104. The power source provides a system power to USB-C/PD system 100. Power converter 106 converts the input voltage to a different voltage to be supplied to port 112. In one embodiment, power converter 106 can decrease the input voltage to a lower voltage (e.g., referred to as a step down in voltage). Field effect transistor (FET) 110 can be toggled on or off to provide power to port 112. USB controller 102 provides a signal to toggle FET 110 on or off. FET 110 is coupled to port 112 by Vbus line 114. USB controller 102 is coupled to power converter 106 and to FET 110 by communication interface 108. In one embodiment, communication interface 108 is a serial communication interface, such as FB/I2C. In another embodiment, communication interface 108 is a serial communication interface such as RS-232, RS-485, I2C, SPI, or the like. Although illustrated as power converter 106, in one embodiment, the power converter 106 can be a Direct Current to Direct Current (DC-DC) converter. In another embodiment, the power converter 106 is an Alternative Current to Direct Current (AC-DC) converter. Alternatively, other types of power converters (e.g., voltage converters, rectifiers, choppers, or the like) can be used.

Although USB controller 102 is depicted in FIG. 1 as being a separate component from power converter 106 and FET 110, in other embodiments, USB controller 102 can be a USB controller that includes an integrated power FET and/or an integrated power converter (e.g., power regulator).

Power converter 106 can be a linear DC-DC converter, a switched DC-DC converter, or the like. Power converter 106 can alternatively be implemented as an AC-DC converter or other power converter. FET 110 can be an N-channel FET, a P-channel FET, or the like. Port 112 can be a USB-C port, a Micro-USB port, or some other power-providing or power-receiving port.

In the depicted embodiment, USB-C/PD system 100 includes temperature sensors 118. Temperature sensors 118 are coupled to temperature sense controller 116. Temperature sense controller 116 is coupled to USB controller 102 via serial communication line 120. USB controller can provide a signal to temperature sense controller 116 to cause temperature sensors 118 to collect data or measurements of temperature. Thermistor 122 is coupled to USB controller 102. USB controller 102 can directly cause thermistor 122 to collect data or measurements of temperature. A temperature measurement from thermistor 122 can be different from a temperature measurement from temperature sensors 118, as thermistor 122 and temperature sensors 118 can be located at different parts of USB-C/PD system 100. USB controller 102 can also directly measure an input voltage from input line 104. USB controller 102 is coupled to sensor 124. Sensor 124 measures system parameter X. System parameter X represents any other system parameter that can be measured. The sensor 124 can be any type of sensor that obtains the system parameter X. In one embodiment, system parameter X is a temperature. In another embodiment, system parameter X is a battery voltage. In other embodiments, system parameter X can be a current, a power, a cable loss metric, an output power, humidity, or the like. Temperature measurements from temperature sensors 118, temperature measurements from thermistor 122, input voltage measurements from input line 104, and system parameter X measurements from sensor 124 are system parameter data that are inputs to USB controller 102 when USB controller 102 performs dynamic power throttling. In one embodiment, USB controller 102 obtains the system parameter data directly. In another embodiment, sensors provide the system parameter data to USB controller 102. In one embodiment, USB controller 102 includes a terminal coupled to port 112. USB controller 102 further includes a set of terminals to receive the system parameter data. USB controller 102 includes a processing circuit coupled to the terminal and the set of terminals and causes USB controller 102 to perform dynamic power throttling. In one embodiment, the processing circuit determines a system operating condition based on the system parameter data. The processing circuit determines a power level corresponding to the system operating condition and sets a power setting of USB-C/PD system 100 to the power level. The USB controller 102 can be considered a port controller.

USB controller 102 can determine a system operating condition based on the data for the system parameters. To determine the system operating condition, USB controller 102 determines an operating condition for each of the system parameters.

In one embodiment, USB controller 102 determines a first operating condition for a first system parameter associated with temperature sensors 118. To determine the first operating condition, USB controller 102 compares a first temperature measurement value from temperature sensors 118 to a first set of one or more temperature thresholds. USB controller 102 identifies the first operating condition based on comparing the first temperature measurement value to the first set of one or more temperature thresholds. USB controller 102 determines a second operating condition for a second system parameter associated with thermistor 122. USB controller 102 compares a second temperature measurement value from thermistor 122 to a second set of one or more temperature thresholds. USB controller 102 identifies the second operating condition based on comparing the second temperature measurement value to the second set of one or more temperature thresholds. USB controller 102 determines a third operating condition for a third system parameter associated with the input voltage at input line 104. USB controller 102 compares an input voltage measurement to a set of one or more voltage thresholds. USB controller 102 identifies the third operating condition based on comparing the input voltage measurement to the set of one or more voltage thresholds. USB controller 102 determines a fourth operating condition for a fourth system parameter for system parameter X associated with sensor 124. USB controller 102 compares a system parameter X measurement to a set of one or more system parameter X thresholds. USB controller 102 identifies the fourth operating condition based on comparing the system parameter X measurement to the set of one or more system parameter X thresholds. Alternatively, each operating condition can be determined in a different manner, such as by monitoring via a terminal (e.g., a status pin) coupled to a sensor. It should also be noted that the four parameters are examples and the actual number of parameters can be more than this number of parameters.

Each operating condition can correspond to a different power level. The power level is specified as a power budget value of port 112. In one embodiment, the power budget value is a percentage of a full power level. In another embodiment, the power budget value is a fraction of the full power level. The full power level corresponds to a maximum power amount that can be supplied by port 112. USB controller can include a memory to store a mapping between operating condition and power level. The mapping can be the same or similar to a mapping as described in reference to FIG. 6. In one embodiment, the mapping can be preconfigured and stored on USB controller 102 at a time of manufacturing to meet requirements of an end user. In another embodiment, the mapping can be dynamically programmed by the end user.

USB controller 102 compares the first operating condition, the second operating condition, the third operating condition, and the fourth operating condition and determines a system operating condition as the operating condition that is the most critical (or least stable). The operating condition that is the most critical is the operating condition that corresponds to a lowest power level. USB controller 102 is configured to cause port 112 to operate at a power level corresponding to the system operating condition.

Although USB-C/PD system 100 is depicted as being a power provider, in other embodiments, the USB-C/PD system may be a USB-C power consumer. The USB-C power consumer may be implemented with the firmware-based method for dynamic power throttling based on system conditions of the USB-C power consumer.

Figure 2:
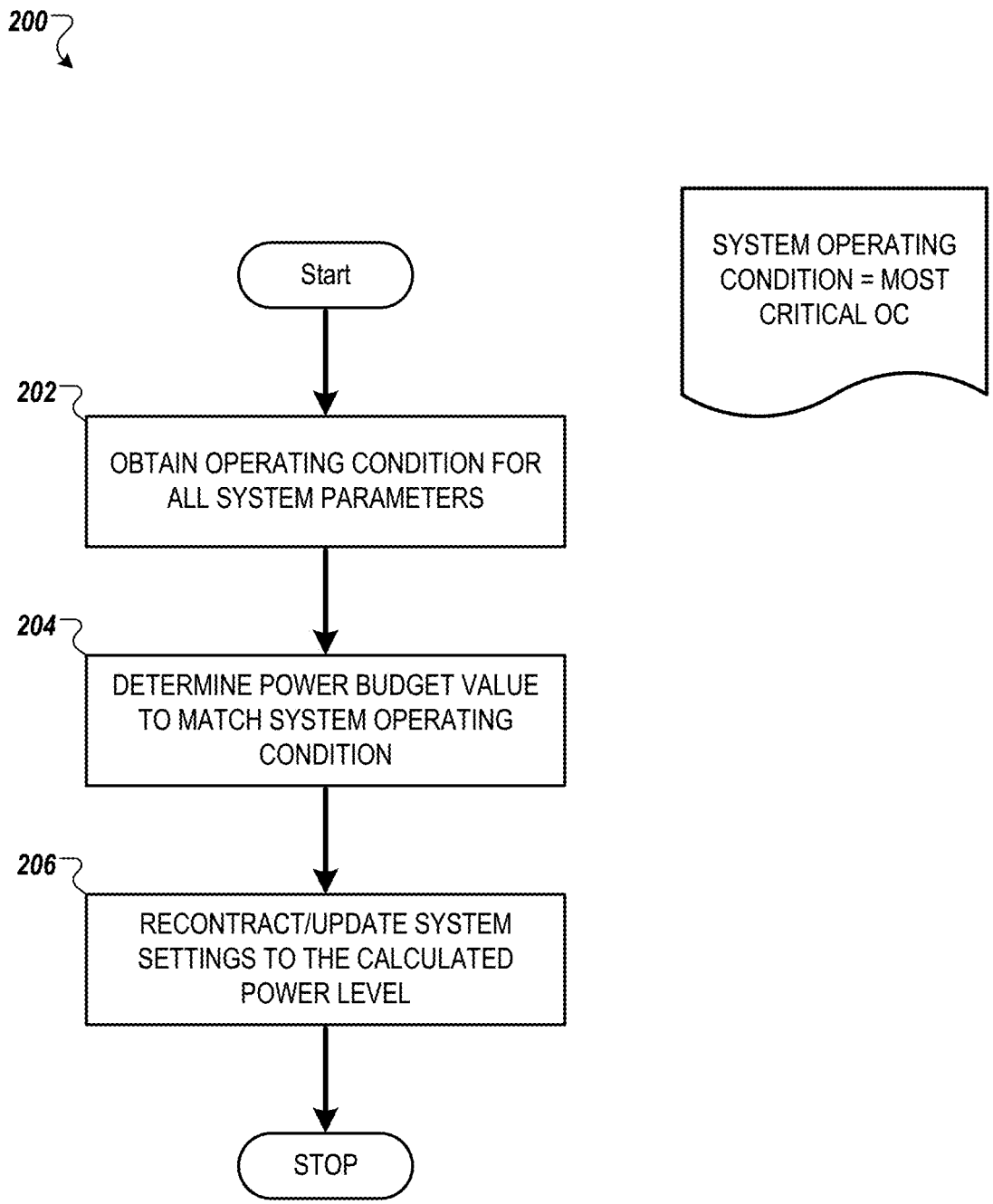
FIG. 2 is a flow diagram of a method of dynamic power throttling according to one embodiment.

FIG. 2 is a flow diagram of a method 200 of dynamic power throttling according to one embodiment. The method 200 may be performed by processing logic that comprises hardware (e.g., circuitry, dedicated logic, programmable logic, microcode, etc.), software, firmware, or a combination thereof. In one embodiment, the method 200 may be performed by any of the processing devices described herein. In one embodiment, the method 200 is performed by processing logic of a USB controller such as USB controller 102 of FIG. 1. In one embodiment, the USB controller executes a firmware algorithm that performs the following operations. In another embodiment, the USB controller has embedded code or logic and is configured to execute instructions to perform the following operations.

USB Type-C/PD system 100 can be part of a USB-C charger in a vehicle, car, truck, van, boat, plane, building, house, or the like. USB-C/PD system may be a power adapter that can include a DC-DC power converter, and the power adapter can be part of a headunit of an automobile, a rear-seat entertainment system of the automobile, a rear-seat charger of the automobile, or the like. The power adapter can be a multi-port power adapter, and power can be dynamically throttled to each port of the multi-port adapter. Alternatively, USB-C/PD system 100 can be a power adapter than can include an AC-DC power converter, and the power adapter can be part of USB-C wall charger, a USB-C power bank, a USB-C power hub, a power adapter, or the like. USB-C/PD system 100 can be a multi-port power adapter, such as a multiport wall charger, a multi-port power hub, a multi-port power bank, or the like. Another type of system, such as a wall outlet, a Micro-USB/PD system, or the like can be implemented with the dynamic power throttling algorithm described herein.

Referring back to FIG. 2, the method 200 begins by the processing logic obtaining a first operating condition (OC) for a first system parameter (block 202). A system parameter can be temperature, input voltage, battery voltage, or other parameter that can be measured, such as a cable loss metric, an output voltage, humidity, or the like. The processing logic monitors the first system parameter regularly to check whether there is any change in state or value of the first system parameter. To monitor the first system parameter, the processing logic measures or receives a measurement corresponding to the first system parameter. The processing logic determines the first operating condition based on the measurement of the first system parameter.

The processing logic may determine the first operating condition from a set of OCs (e.g., OC1, OC2, OC3, etc.). Each operating condition corresponds to a range of system parameter values. For example, in one embodiment, if the first system parameter is in a first range of values, the processing logic determines that the first operating condition is OC1. If the first system parameter is in a second range of values, the processing logic determines that the first operating condition is OC2. If the first system parameter is in a third range of values, the processing logic determines that the first operating condition is OC3. In another embodiment, if the first system parameter is below a first threshold value, the processing logic determines that the first operating condition is OC1. If the first system parameter is between the first threshold value and a second threshold value, the processing logic determines that the first operating condition is OC2. If the first system parameter is above the second threshold value, the processing logic determines that the first operating condition is OC3.

Each operating condition corresponds to a power level which specifies a power budget value. For example, in one embodiment, OC1 may correspond to a first power level, OC2 may correspond to a second power level, and OC3 may correspond to a third power level, etc. The processing logic defines the first operating condition to be a current OC. If a system operating condition is not yet defined, the processing logic defines the current operating condition to be the system OC. If the system operating condition is already defined and is not equal to the current OC, the processing logic updates the system operating condition to be the current OC. If the system operating condition is already defined and is equal to the current OC, the processing logic takes no action.

Referring back to FIG. 2, the processing logic determines the power level to match the system operating condition (block 204). The processing logic updates system settings to a calculated power budget value based on the power level (block 206). The processing logic causes a port to supply the calculated power level. The method 200 ends.

In further embodiments, the processing logic monitors a second system parameter in addition to the first system parameter and obtains a second operating condition for the second system parameter. The processing logic monitors the second system parameter regularly to check whether there is any change in state or value of the second system parameter. The processing logic measures or receives a measurement corresponding to the second system parameter. The processing logic determines the second operating condition of the second system parameter based on the measurement of the second system parameter.

The processing logic compares the first operating condition of the first system parameter and the second operating condition of the second system parameter and determines a current operating condition that is equal to one of the first operating condition or the second operating condition that is the most critical or least stable (e.g., the operating condition that would require the highest level of power reduction). The operating condition that is the most critical is the operating condition that corresponds to the lowest power level. For example, in one embodiment, the operating condition of the first system parameter corresponds to a power level with a power budget value of 100% and the operating condition of the second system parameter corresponds to a power level with a power budget value of 60%, and the processing logic defines the current operating condition to be the operating condition of the second system parameter. Once the processing logic defines the current operating condition as the most critical OC, the processing logic defines the system OC. If a system operating condition is not yet defined, the processing logic defines the current operating condition to be the system OC. If the system operating condition is already defined and is not equal to the current OC, the processing logic updates the system operating condition to be the current OC. If the system operating condition is already defined and is equal to the current OC, the processing logic takes no action.

In further embodiments, the processing logic may repeat the method 200 for a set of system parameters. The set of system parameters may include one, two, three, four, or more system parameters. The processing logic monitors the set of system parameters regularly to check whether there is any change in state or value of the set of system parameters. The processing logic measures or receives a measurement corresponding to each of the set of system parameters. The processing logic determines a set of OCs corresponding to each of the set of system parameters based on the measurements of each of the set of system parameters.

The processing logic compares each of the set of system parameters and determines a current operating condition that is equal one of the set of OCs that is the most critical (or least stable). The operating condition that is the most critical is the operating condition that corresponds to the lowest budget value. Once the processing logic defines the current operating condition most critical OC, the processing logic defines the system OC. If a system operating condition is not yet defined, the processing logic defines the current operating condition to be the system OC. If the system operating condition is already defined and is not equal to the current OC, the processing logic updates the system operating condition to be the current OC. If the system operating condition is already defined and is equal to the current OC, the processing logic takes no action.

Figure 3:
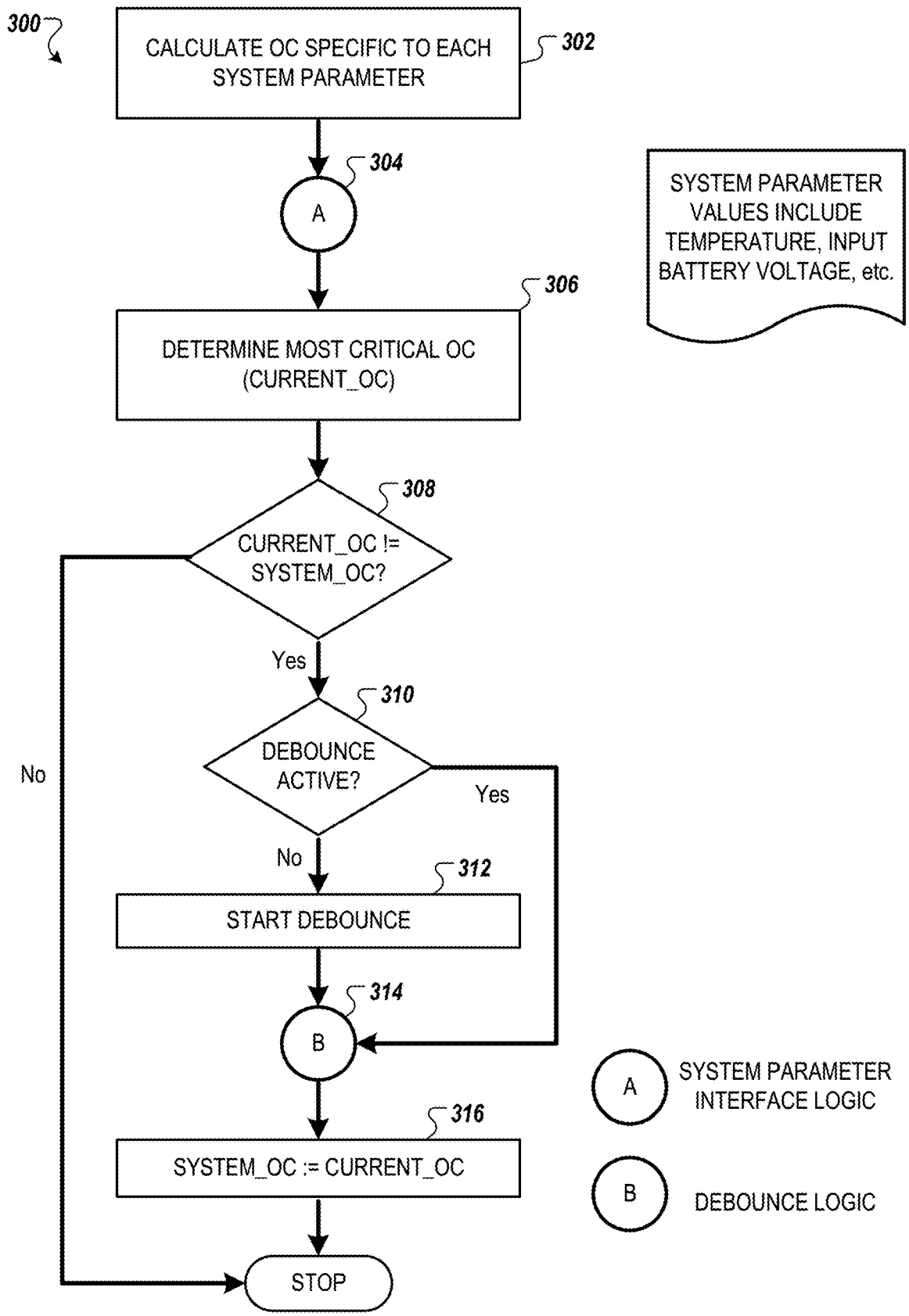
FIG. 3 is a flow diagram of a method of dynamic power throttling according to one embodiment.

FIG. 3 is a flow diagram of a method 300 of dynamic power throttling according to one embodiment. The method 300 may be performed by processing logic that comprises hardware (e.g., circuitry, dedicated logic, programmable logic, microcode, etc.), software, firmware, or a combination thereof. In one embodiment, the method 300 may be performed by any of the processing devices described herein. In one embodiment, the method 300 is performed by processing logic of a USB controller, such as USB controller 102 of FIG. 1. In one embodiment, the USB controller executes a firmware algorithm that performs the following operations. In another embodiment, the USB controller has embedded code or logic and is configured to execute instructions to perform the following operations.

Referring back to FIG. 3, the method 300 begins by the processing logic calculating an operating condition specific to each system parameter (block 302). A system may have one system parameter or a set of system parameters such as two, three, four, etc. At block 304, the processing logic performs a system parameter interface method. During this step, the processing logic applies hysteresis to ensure that calculating the operating condition based on a measurement or a read of each of the system parameters is correctly done. The processing logic determines a current operating condition as a most critical operating condition (CURRENT_OC) (block 306). The processing logic compares the current operating condition to a system operating condition to determine if they are the same (block 308). In a first case, the current operating condition is the same as the system OC, meaning that none of the system parameters changed by an amount enough to change their corresponding OCs, and the method 300 ends. In a second case, the current operating condition is not the same as the system OC. The processing logic checks if a debounce method is active (block 310). If the debounce method is active the processing logic performs the debounce method (block 314). If the debounce method is not active, the processing logic activates the debounce method (block 312) and performs the debounce method (block 314). The processing logic performs the debounce method to ensure that the difference between the current operating condition and the system operating condition did not result from a faulty system parameter measurement. Once the processing logic determines that the difference between the current operating condition and the system operating condition is persistent, the processing logic sets the system operating condition to the current operating condition (block 316); the method 300 ends.

Figure 4:
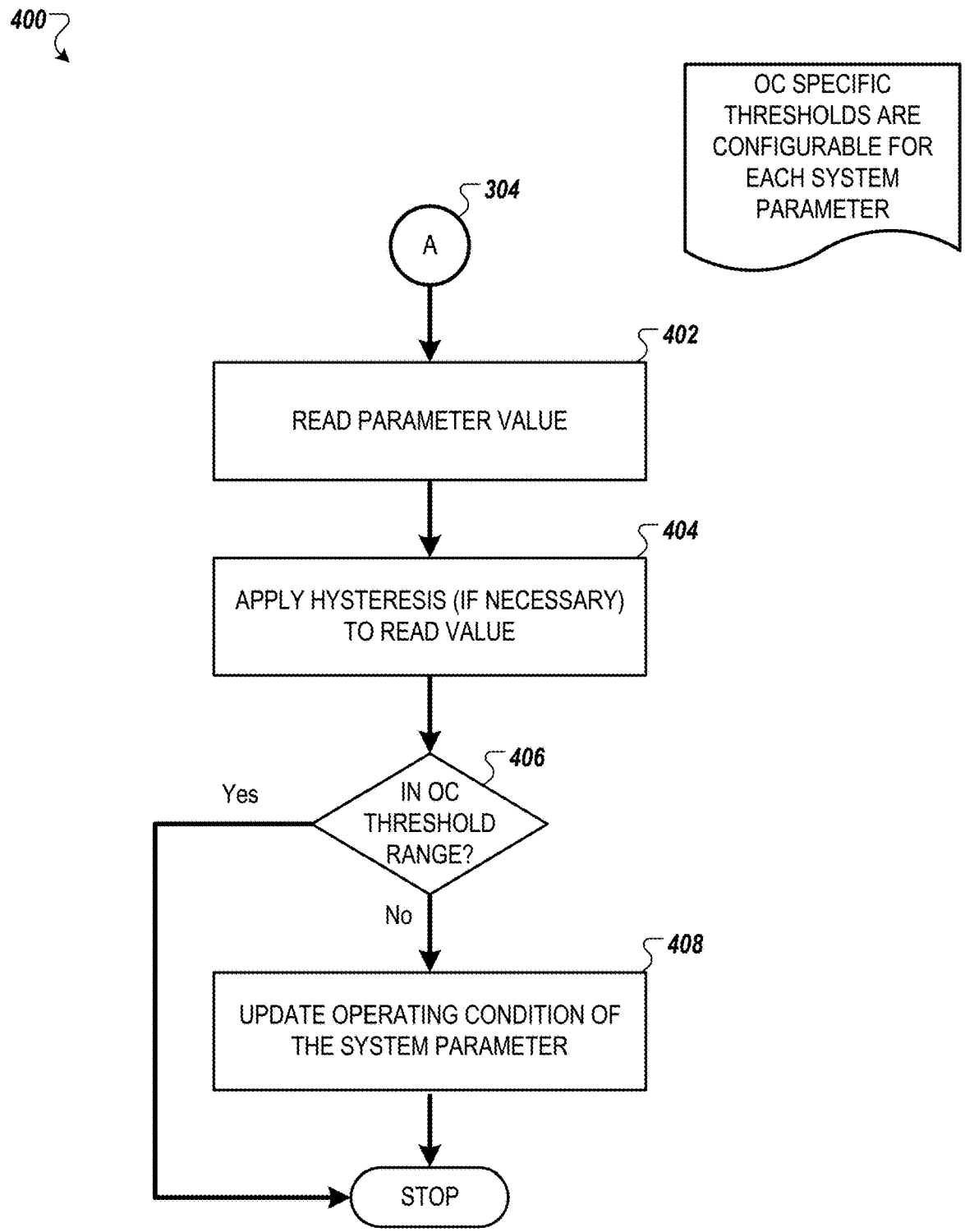
FIG. 4 is a flow diagram of a method to update an operating condition of a system parameter for dynamic power throttling according to one embodiment.

FIG. 4 is a flow diagram of a method 400 to update an operating condition of a system parameter for dynamic power throttling according to one embodiment. The method 400 may be performed by processing logic that comprises hardware (e.g., circuitry, dedicated logic, programmable logic, microcode, etc.), software, firmware, or a combination thereof. In one embodiment, the method 400 may be performed by any of the processing devices described herein. In one embodiment, the method 400 is performed by processing logic of a USB controller such as USB controller 102 of FIG. 1. The processing logic performs the method 400 for each system parameter. The method 400 is used by the processing logic to ensure that a faulty system parameter value reading does not result in setting or changing an operating condition of the system parameter value inaccurately.

Referring back to FIG. 4, the method 400 begins at block 304 of FIG. 3. At block 402, the processing logic reads a system parameter value. In one embodiment, the processing logic reads the system parameter value from a sensor. In another embodiment, a sensor controller sends the system parameter value to the processing logic. At block 404, if necessary, the processing logic applies hysteresis to the system parameter value. The processing logic may apply a hysteresis check when the system parameter value has changed by a threshold amount from a previous read of the system parameter value. In one embodiment, the threshold amount may be a percentage or an absolute value. In another embodiment, the processing logic may apply the hysteresis check when the system parameter value has changed by a threshold amount from a set of previous reads of the system parameter value. In other embodiments, the processing logic may apply the hysteresis check when the system parameter value has changed by a threshold amount from a calculation based on set of previous reads of the system parameter value, such as a mean, median, a boxcar average, or the like.

In another embodiment, the processing logic performs the hysteresis check by ensuring that there are no measurement swings in the threshold between two operating conditions. A hysteresis correction factor can be applied to a measured value as the system moves from a lower power to a higher power level in order to prevent any erroneous readings that could trigger the system to shift power levels based on a faulty reading. Such a hysteresis check can provide additional protection when the system increases a power level or changes the system operating condition.

The processing logic checks if the system parameter value read from the sensor is within a threshold range of an old operating condition (block 406). The old operating condition corresponds to the previous read of the system parameter value. The threshold range of system parameter values corresponding to a given OC. In one embodiment, the threshold range is between a first system parameter value and a second system parameter value. In another embodiment, the threshold range is below a threshold system parameter value. In another embodiment, the threshold range is above a threshold system parameter value. If the system parameter value read from the sensor is within the threshold of the old OC, then an operating condition of the system parameter value is unchanged and the method 400 ends. If the system parameter value read from the sensor is not within the threshold of the old OC, then the operating condition of the system parameter value is changed. The processing logic updates the old operating condition to the changed operating condition of the system parameter value read from the sensor (block 408). The method 400 ends. When the method 400 ends, the processing logic performs block 306 of FIG. 3.

Figure 5:
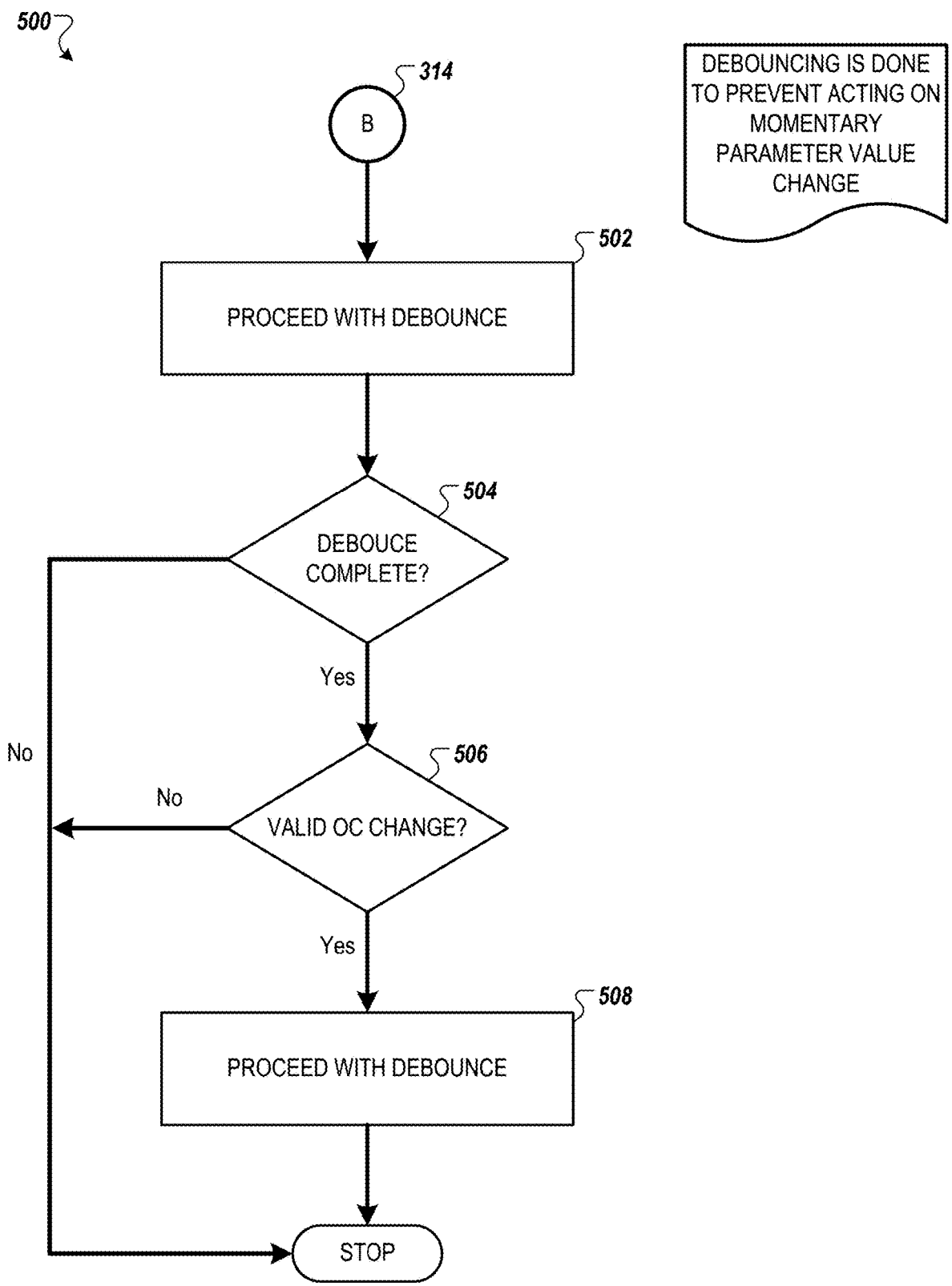
FIG. 5 is a flow diagram of a method for debounce in dynamic power throttling according to one embodiment.

FIG. 5 is a flow diagram of a method 500 for debounce in dynamic power throttling according to one embodiment. The method 500 may be performed by processing logic that comprises hardware (e.g., circuitry, dedicated logic, programmable logic, microcode, etc.), software, firmware, or a combination thereof. In one embodiment, the method 500 may be performed by any of the processing devices described herein. In one embodiment, the method 200 is performed by processing logic of a USB controller such as USB controller 102 of FIG. 1. The method 500 is used by the processing logic to ensure that a power throttling does not occur for faulty or erroneous system parameter value readings. Multiple samples of system parameters are considered to ensure that a system operating condition is not determined from a single or a few faulty readings.

Referring back to FIG. 5, the method 500 begins at block 314 of FIG. 3. The processing logic compares the current operating condition to the system operating condition as described in reference to FIG. 3. The processing logic proceeds with debounce (block 502) when the current operating condition is not the same as the system OC. In one embodiment, system parameter values are read at multiple points in time and compared to ensure that a single or a few faulty readings do not determine the system OC. Debouncing is performed to make the dynamic power throttling method 300 robust against momentary system parameter value changes. During debounce, the system parameter values are sampled again at a later time, and the debounce current operating condition is determined (block 504). The later time can occur at a time which is shorter than the time interval at which the system parameters are sampled. In other words, during debounce the system parameter values are sampled before they would have been resampled without debounce. The processing logic compares the debounce current operating condition and the current operating condition (block 506). If the debounce current operating condition at the later time is the same as the current OC, then the processing logic updates the system operating condition to the current operating condition (block 508) and the method 500 ends.

Figure 6:
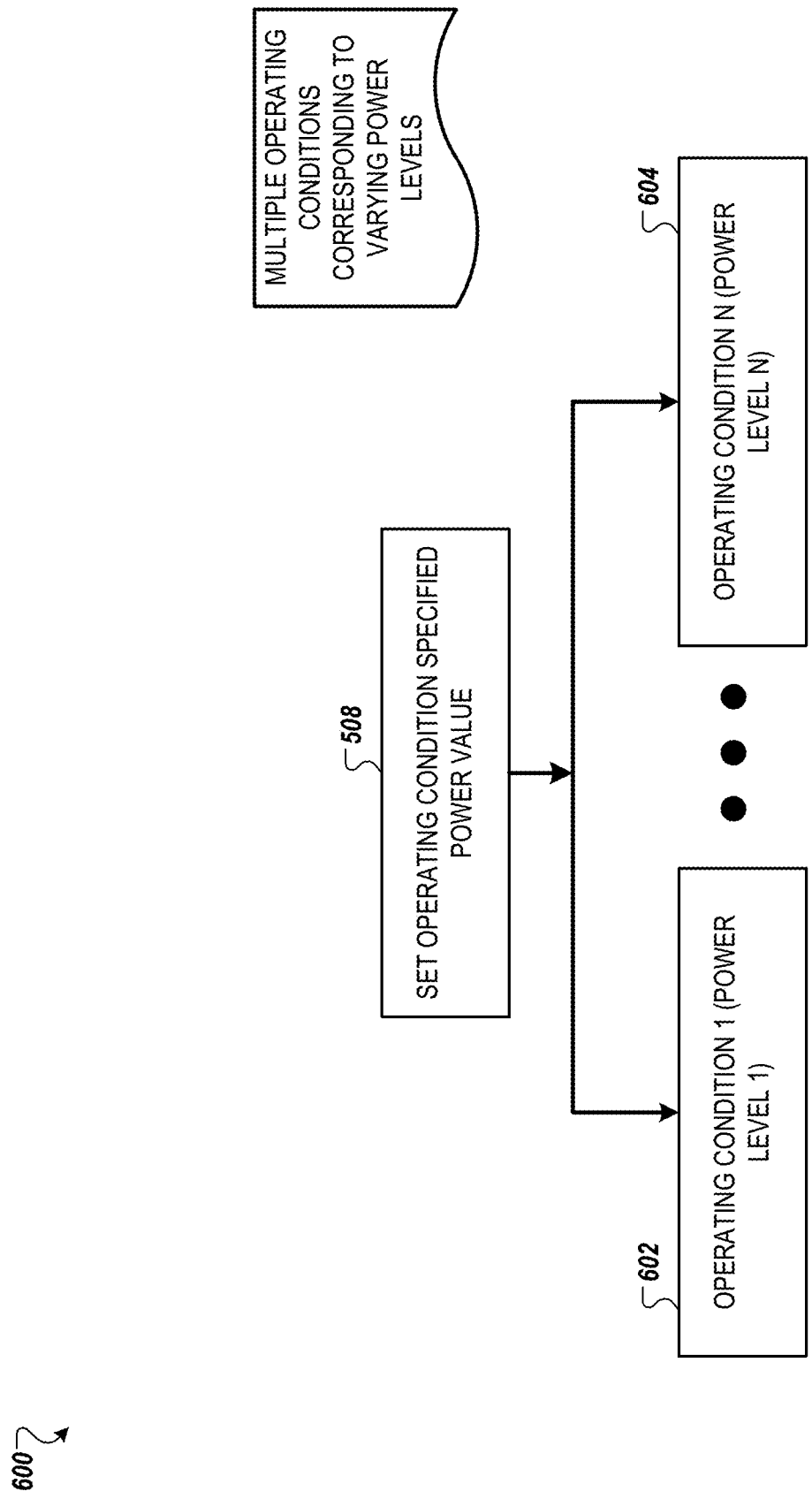
FIG. 6 is a flow diagram of a mapping between operating condition and power budget value in dynamic power throttling according to one embodiment.

FIG. 6 is a flow diagram of a mapping 600 between operating condition and power budget value in dynamic power throttling according to one embodiment. Block 508 is block 508 of FIG. 4. The mapping 600 may be preconfigured to meet requirements of an end user. The firmware algorithm for dynamic power throttling does not make any assumptions about power levels corresponding to each operating condition level. Mapping 600 can be stored in memory of a controller, such as USB controller 102 of FIG. 1. The controller can be a controller of a system, such as USB-C/PD system 100 of FIG. 1.

After the controller calculates a power level of the system, system settings and power data objects (PDOs) can be updated to reflect new power values. Multiple operating conditions can correspond to varying power levels. A first operating condition can correspond to a first power level (block 602), a second operating condition can correspond to a second power level, a third operating condition can correspond to a third power level, and so on, and an Nth operating condition can correspond to an Nth power level (block 604). For an example, there are four operating conditions, and a first operating condition corresponds to a power level of 100%, a second operating condition corresponds to a power level of 50%, a third operating condition corresponds to a power level of 15 Watts (W), and a fourth operating condition corresponds to a power level of 0W (e.g., shutdown). For another example, there are four operating conditions, and a first operating condition corresponds to a power level of 100%, a second operating condition corresponds to a power level of 50%, a third operating condition corresponds to a power level of 25%, and a fourth operating condition corresponds to a power level of 0W (e.g., shutdown). In other embodiments, each operating condition corresponds to a unique power level. In one embodiment, the first operating condition corresponds to a power level of 100% and the Nth operating condition corresponds to a power level of 0W (e.g., shutdown), at which the system no longer operates.

In one embodiment, the mapping 600 is preconfigured and is stored as part of the firmware algorithm for dynamic power throttling. In another embodiment, an end-user can dynamically configure the mapping 600 to meet user requirements.

Figure 7:
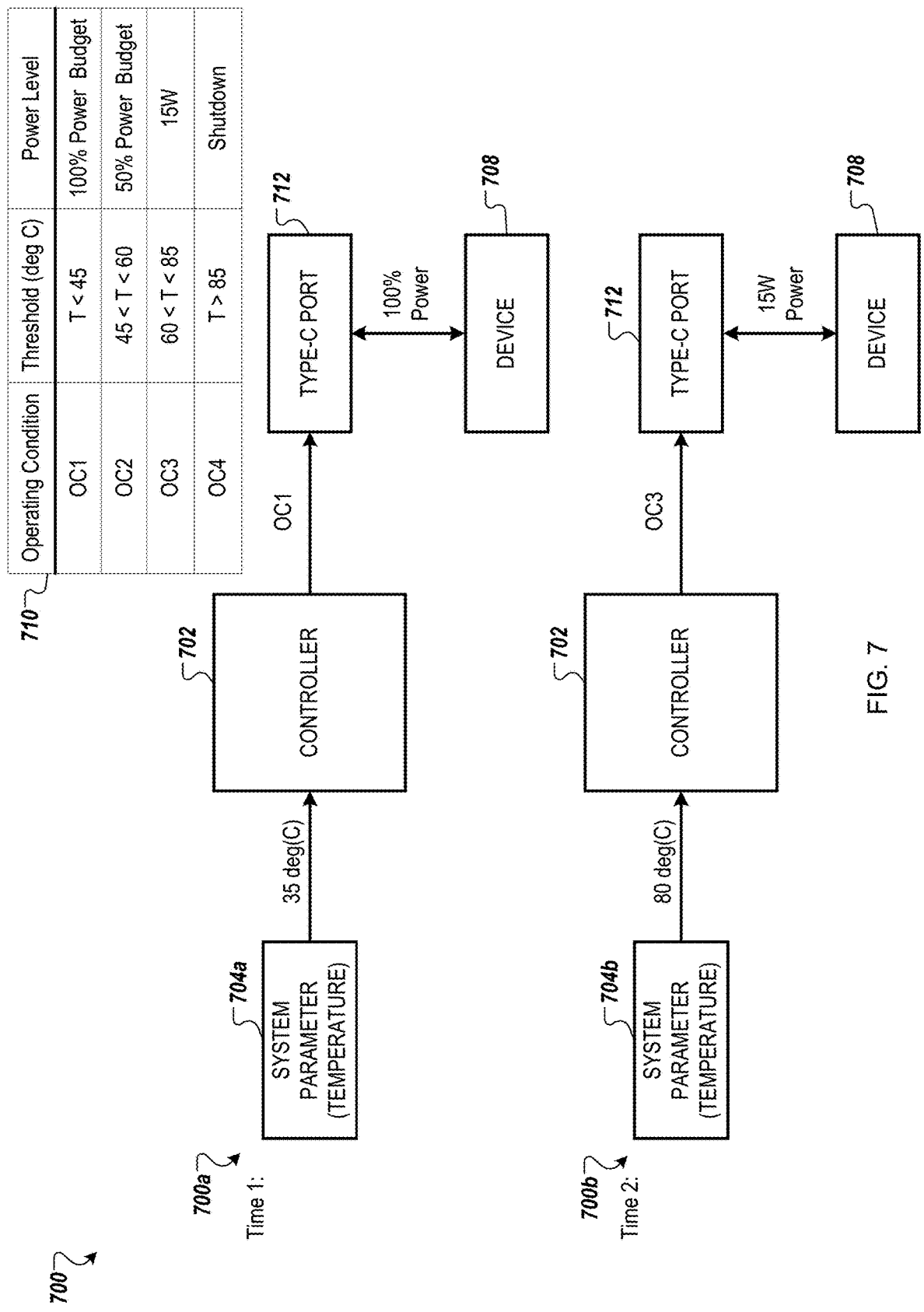
FIG. 7 is a functional diagram of a system that performs power throttling with one system parameter according to one embodiment.

FIG. 7 is a functional diagram of a system 700 that performs power throttling with one system parameter according to one embodiment. In one embodiment, system 700 may be a USB Type-C/PD system. In another embodiment, system 700 may be a Micro-USB PD system. In other embodiments, system 700 is a PD system. System 700 includes controller 702 and port 712. Device 708 is connected to port 712. Controller 702 includes memory to store a firmware algorithm for dynamic power throttling and a mapping between operating condition and power level, which specifies a power budget value, such as mapping 600 of FIG. 6. Controller 702 includes processing logic to run the firmware algorithm and perform methods, such as method 200 of FIG. 2, method 300 of FIG. 3, method 400 of FIG. 4, and method 500 of FIG. 5. FIG. 7 illustrates the system 700 at two different instances of time. System 700a is the system 700 at a first time. System 700b is the system 700 at a second time.

A mapping 710, as shown in FIG. 7, maps i) a first operating condition corresponding to a first power level with a first power budget value when the system parameter value 704a is less than a first threshold value, ii) a second operating condition corresponding to a second power level with a second power budget value when the system parameter value is between the first threshold value and a second threshold value, iii) a third operating condition corresponding to a third power level with a third power budget value when the system parameter value is between the second threshold value and a third threshold value, and iv) a fourth operating condition corresponding to a fourth power level with a fourth power budget value when the system parameter value is greater than the third threshold value. In other embodiments, controller 702 may be preconfigured with a mapping that maps two OCs to two power levels, three OCs to three power levels, etc. In the depicted embodiment, controller 702 is preconfigured with a mapping 710 that maps four OCs to four power budget values.

In system 700a, at a first instance of time, controller 702 receives a system parameter value 704a as an input. In the depicted embodiment, the system parameter value 704a is a temperature. In other embodiments, the system parameter can be an input voltage, a battery voltage, an output voltage, a cable loss metric, humidity, or other parameter that can be measured. Controller 702 receives system parameter value 704a (35 degrees Celsius (deg C)) as an input and determines that system parameter value 704a is below the first threshold value (45 deg C.), and determines that the operating condition is the first operating condition (OC1). Controller 702 determines that the first operating condition corresponds to the first power budget value (100% Power Budget), and updates system settings so that port 712 can provide the first power budget value to a device 708.

In system 700b, at a second instance of time, controller 702 receives a system parameter value 704b as an input. The second instance of time is different than the first instance of time. In one embodiment, the first instance of time may be when the system 700 is initialized, and the second instance of time may be during operation of system 700. In other embodiments, the first instance of time may be during operation of system 700 and the second instance of time may be later during operation of system 700. Controller 702 receives system parameter value 704b (80 deg C.) as an input and determines that system parameter value 704b is between the second threshold value (60 deg C.) and the third threshold value (85 deg C.), and determines that the operating condition is the third operating condition (OC3). Controller 702 determines that the third operating condition corresponds to the third power budget value (15 W). Controller 702 performs a debounce method, such as method 500 of FIG. 5, to ensure that the change in operating condition between the first instance of time and the second instance of time is valid. Controller 702 then updates the system settings so that port 712 can provide the third budget level to device 708.

Figure 8A:
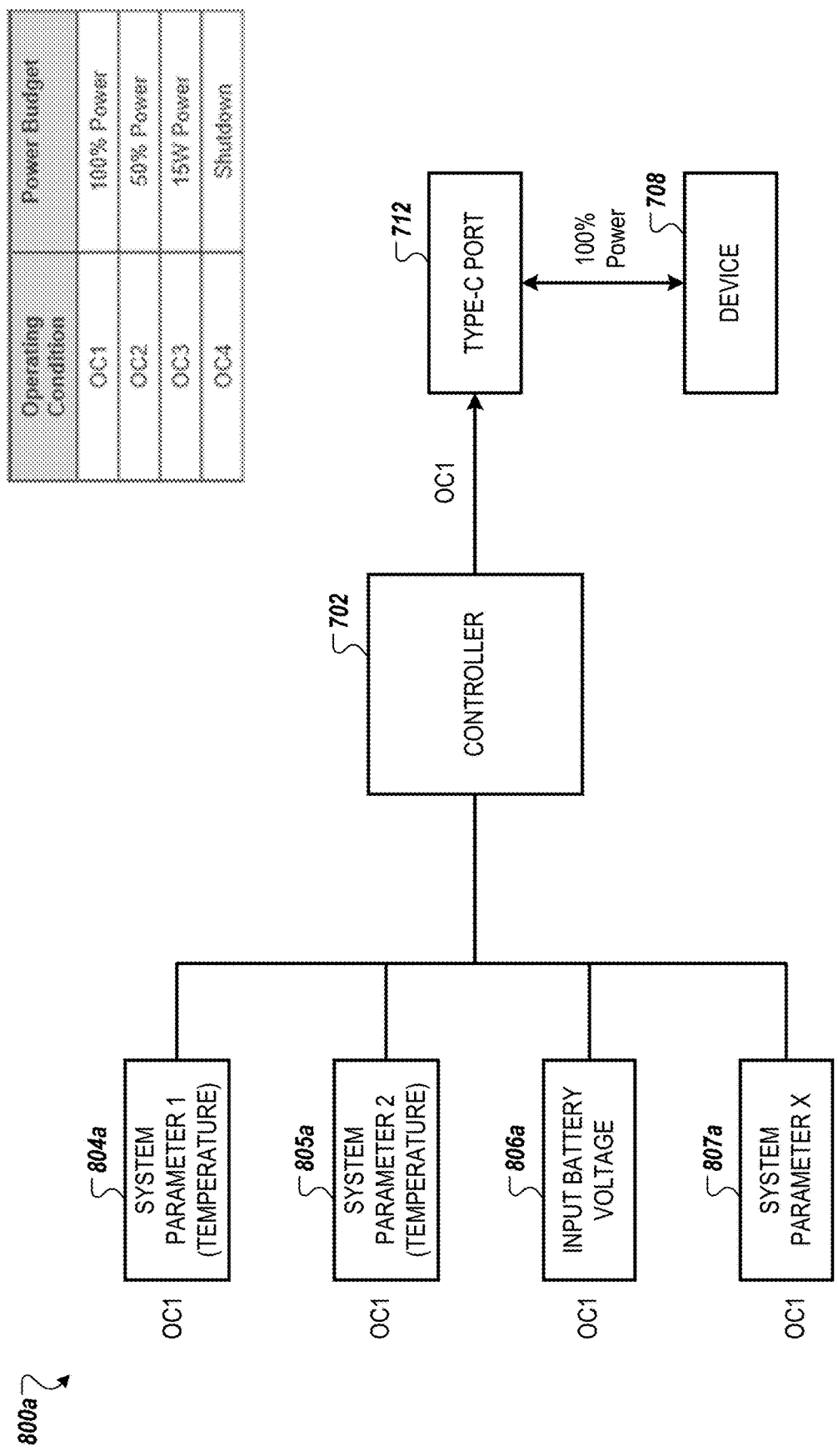
FIG. 8A is a functional diagram of a system that performs dynamic power throttling with four system parameters according to one embodiment.

FIG. 8A is a functional diagram of a system 800a that performs dynamic power throttling with four system parameters according to one embodiment. The system 800 may be the same or similar to the system 700 as noted by similar reference numbers. Controller 702 includes memory to store a firmware algorithm for dynamic power throttling and a mapping between operating condition and power budget value, such as mapping 600 of FIG. 6. Controller 702 includes processing logic to run the firmware algorithm and perform methods, such as method 200 of FIG. 2, method 300 of FIG. 3, method 400 of FIG. 4, and method 500 of FIG. 5.

In one embodiment, controller 702 receives first system parameter value 804*a*, second system parameter value 805*a*, third system parameter value 806*a*, and fourth system parameter value 807*a*. First system parameter value 804*a* is a temperature that may be measured at a first spatial location of a USB PD system. Second system parameter value 805*a* is a temperature that may be measured at a second spatial location of the USB PD system. Third system parameter value 806*a* is an input battery voltage that controller 702 may measure at a power input of the USB PD system. Fourth system parameter value 807*a* can be any system parameter that can be measured.

The mapping maps a first operating condition (OC1) to a first power budget value (100% power), a second operating condition (OC2) to a second power budget value (50% power), a third operating condition (OC3) to a third power budget value (15 W power), and a fourth operating condition (OC4) to a fourth power budget value (Shutdown). The operating condition corresponding to each system parameter can be configured independently of one another. For example, in one embodiment, the first system parameter may have OC1, OC2, and OC4 configured while the second system parameter may have OC2 and OC3 configured. A threshold corresponding to each operating condition for each system parameter is further configurable. For example, in one embodiment, for the first system parameter, the operating condition may be i) a first operating condition when the first system parameter value is less than a first threshold value, ii) a second operating condition when the first system parameter value is between the first threshold value and a second threshold value, iii) a third operating condition when the first system parameter value is between the second threshold value and a third threshold value, and iv) a fourth operating condition when the first system parameter value is greater than the third threshold value, while for the second system parameter, the operating condition may be i) the first operating condition when the second system parameter value is less than a fourth threshold value, ii) the second operating condition when the second system parameter value is between the fourth threshold value and a fifth threshold value, iii) the third operating condition when the second system parameter value is between the fifth threshold value and a sixth threshold value, and iv) the fourth operating condition when the second system parameter value is greater than the sixth threshold value, and so on. For example, in another embodiment, for the first system parameter, the operating condition may be i) the first operating condition when the first system parameter value is in a first range of values, ii) the second operating condition when the first system parameter value is in a second range of values, iii) the third operating condition when the first system parameter value is in a third range of values, and iv) the fourth operating condition when the first system parameter value is in a fourth range of values, while for the second system parameter, the operating condition may be i) the first operating condition when the second system parameter value is in a fifth range of values, ii) the second operating condition when the second system parameter value is in a sixth range of values, iii) the third operating condition when the second system parameter value is in a seventh range of values, and iv) the fourth operating condition when the second system parameter value is in an eighth range of values and so on.

In the depicted embodiment, controller 702 determines that an operating condition of the first system parameter with first system parameter value 804*a* is the first operating condition (OC1), an operating condition of the second system parameter with second system parameter value 805*a* is the first operating condition, an operating condition of the third system parameter with third system parameter value 806*a* is the first operating condition, and an operating condition of the fourth system parameter with fourth system parameter value 807*a* is the first operating condition. Controller 702 sets a system operating condition as the first operating condition corresponding to the first power budget value (100% power). Controller 702 updates system settings so that port 712 can provide the first power budget value to a device 708.

Figure 8B:
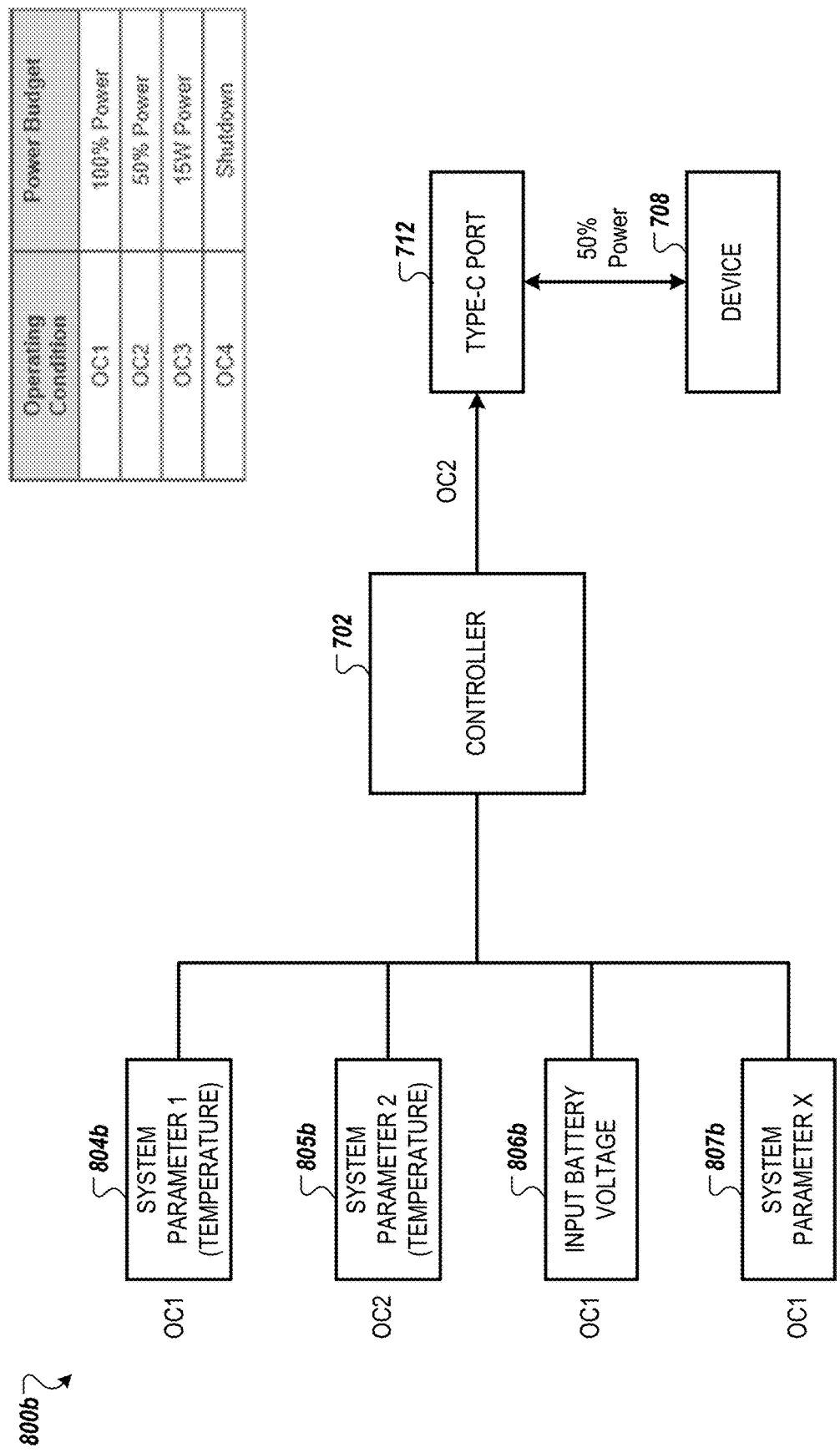
FIG. 8B is a functional diagram of a system that performs dynamic power throttling with four system parameters according to one embodiment.

FIG. 8B is a functional diagram of a system 800*b* that performs dynamic power throttling with four system parameters according to one embodiment. System 800*b* is the same as system 800*a* of FIG. 8A. Controller 702 receives first system parameter value 804*b*, second system parameter value 805*b*, third system parameter value 806*b*, and fourth system parameter value 807*b*. Controller 702 determines that an operating condition of the first system parameter with first system parameter value 804*b* is the first operating condition (OC1), an operating condition of the second system parameter with second system parameter value 805*b* is the second operating condition (OC2), an operating condition of the third system parameter with third system parameter value 806*b* is the first operating condition, and an operating condition of the fourth system parameter with fourth system parameter value 807*b* is the first operating condition. Because the operating condition of second system parameter changed (from the first operating condition in FIG. 8A to the second operating condition in FIG. 8B), controller 702 applies a hysteresis check, as described with respect to FIG. 4, to ensure that the operating condition change is valid. Controller 702 sets a current operating condition as the second operating condition corresponding to the second power budget value, since the second operating condition is more critical than the first operating condition. If the current operating condition and the system operating condition are different, controller 702 begins a debounce method to ensure that the change in operating condition is not triggered by an erroneous system parameter measurement. The debounce method is described in further detail with respect to FIG. 3. Once controller 702 determines that the change in operating condition is not triggered by an erroneous system parameter measurement, controller 702 updates system settings so that port 712 can provide the second power budget value (50% power) to the device 708.

Figure 8C:
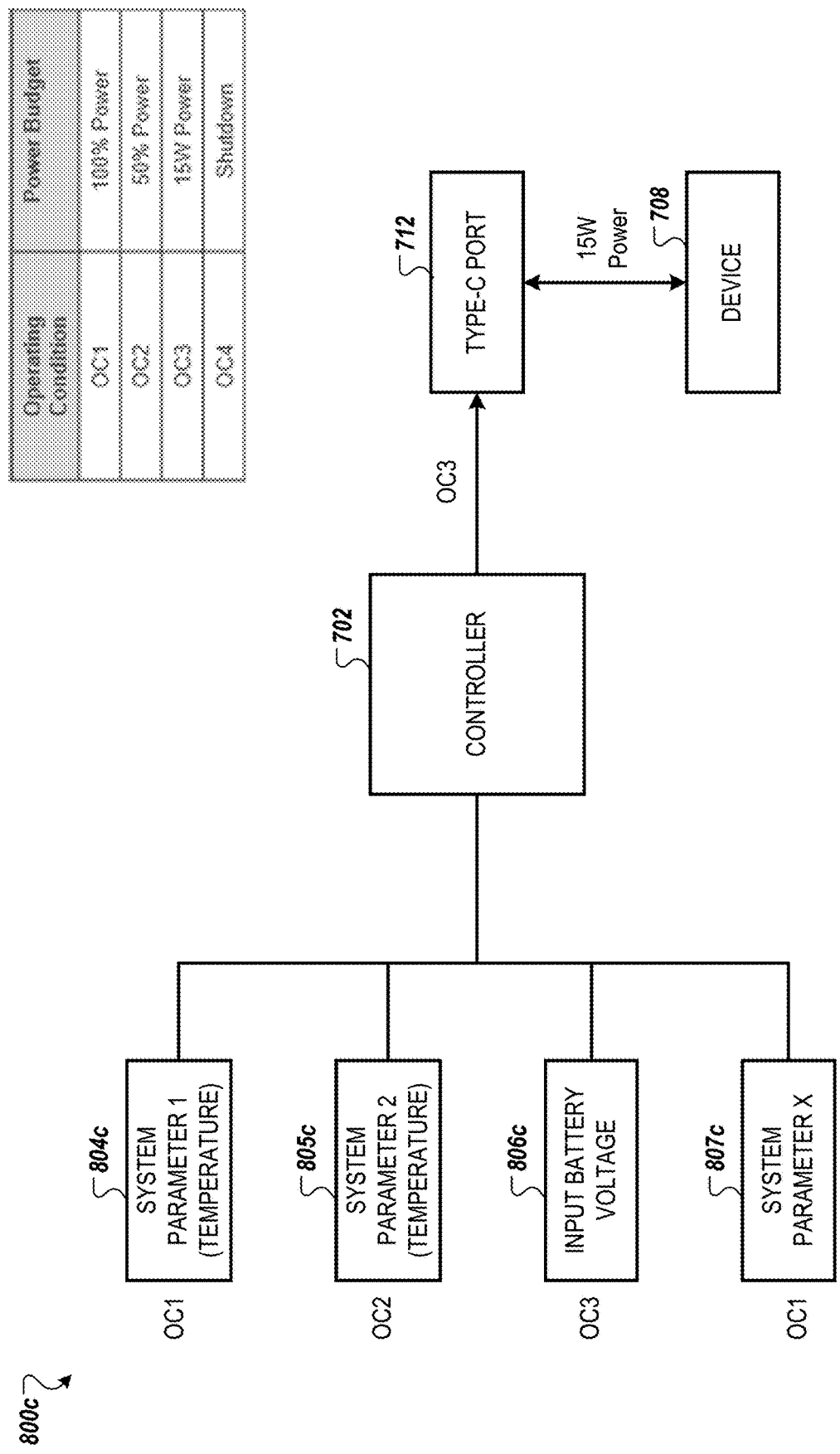
FIG. 8C is a functional diagram of a system that performs dynamic power throttling with four system parameters according to one embodiment.

FIG. 8C is a functional diagram of a system 800*c* that performs dynamic power throttling with four system parameters according to one embodiment. System 800*c* is the same as system 800*a* of FIG. 8A and system 800*b* of FIG. 8B. Controller 702 receives first system parameter value 804*c*, second system parameter value 805*c*, third system parameter value 806*c*, and fourth system parameter value 807*c*. Controller 702 determines that an operating condition of the first system parameter with first system parameter value 804*c* is the first operating condition (OC1), an operating condition of the second system parameter with second system parameter value 805*c* is the second operating condition (OC2), an operating condition of the third system parameter with third system parameter value 806*c* is the third operating condition (OC3), and an operating condition of the fourth system parameter with fourth system parameter value 807*c* is the first operating condition. Because the operating condition of third system parameter changed (from the first operating condition in FIG. 8B to the third operating condition in FIG. 8C), controller 702 applies a hysteresis check, as described with respect to FIG. 4, to ensure that the operating condition change is valid. Controller 702 sets the current operating condition as the third operating condition corresponding to the third power budget value, since the third operating condition is more critical than the first operating condition and the second operating condition. If the current operating condition and the system operating condition are different, controller 702 begins a debounce method to ensure that the change in operating condition is not triggered by an erroneous system parameter measurement. The debounce method is described in further detail with respect to FIG. 3. Once controller 702 determines that the change in operating condition is not triggered by an erroneous system parameter measurement, controller 702 updates system settings so that port 712 can provide the third power budget value (15 W power) to the device 708.

Figure 8D:
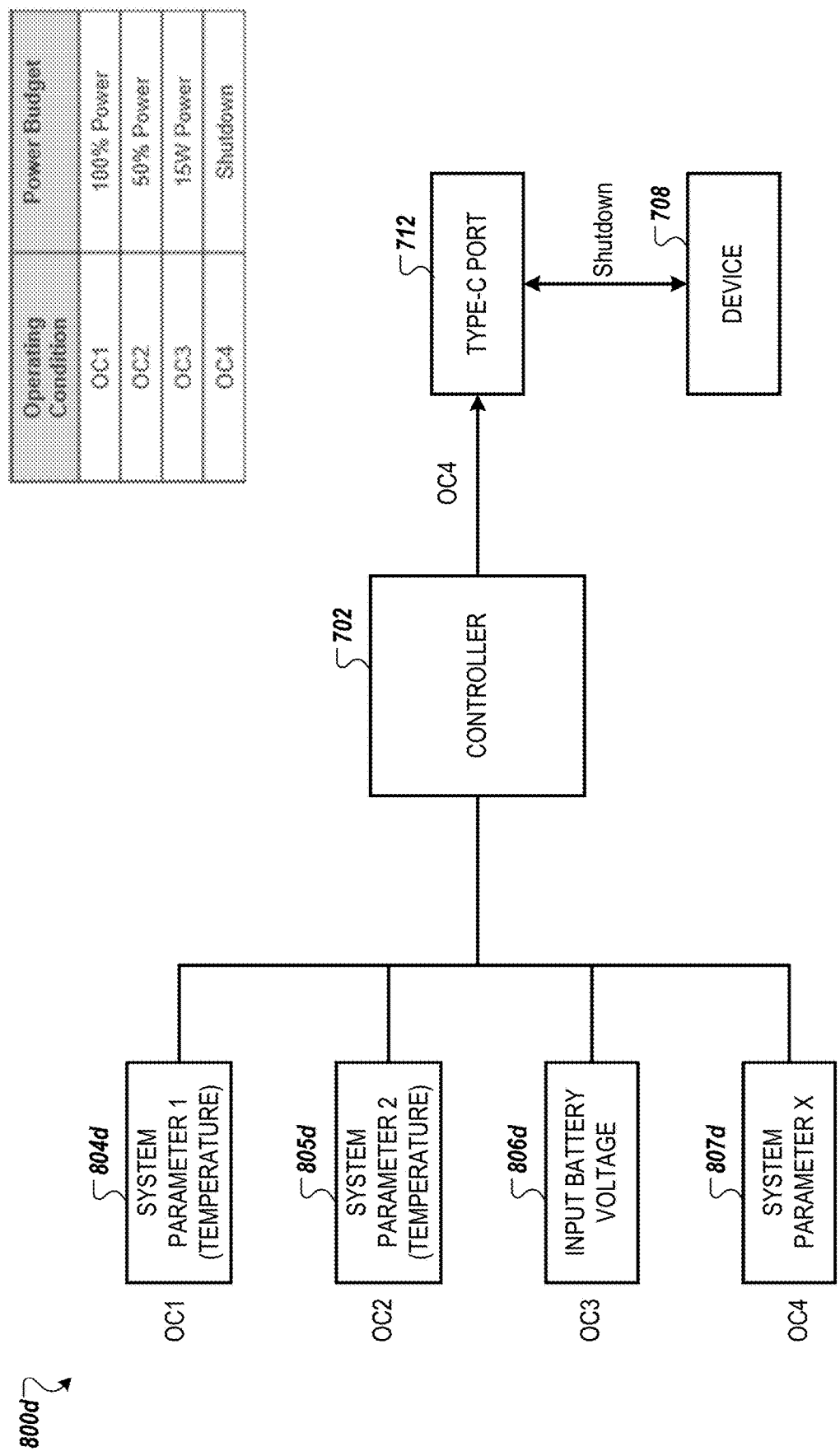
FIG. 8D is a functional diagram of a system that performs dynamic power throttling with four system parameters according to one embodiment.

FIG. 8D is a functional diagram of a system 800*d* that performs dynamic power throttling with four system parameters according to one embodiment. System 800*d* is the same as system 800*a* of FIG. 8A, system 800*b* of FIG. 8B, and system 800*c* of FIG. 8C. Controller 702 receives first system parameter value 804*d*, second system parameter value 805*d*, third system parameter value 806*d*, and fourth system parameter value 807*d*. Controller 702 determines that an operating condition of the first system parameter with first system parameter value 804*d* is the first operating condition (OC1), an operating condition of the second system parameter with second system parameter value 805*d* is the second operating condition (OC2), an operating condition of the third system parameter with third system parameter value 806*d* is the third operating condition (OC3), and an operating condition of the fourth system parameter with fourth system parameter value 807*d* is the fourth operating condition (OC4). Because the operating condition of fourth system parameter value 807*a* changed (from the first operating condition in FIG. 8C to the fourth operating condition in FIG. 8D), controller 702 applies a hysteresis check, as described with respect to FIG. 4, to ensure that the operating condition change is valid. Controller 702 sets the current operating condition as the fourth operating condition corresponding to the fourth power budget value (Shutdown), since the third operating condition is more critical than the first operating condition and the second operating condition. If the current operating condition and the system operating condition are different, controller 702 begins a debounce method to ensure that the change in operating condition is not triggered by an erroneous system parameter measurement. The debounce method is described in further detail with respect to FIG. 3. Once controller 702 determines that the change in operating condition is not triggered by an erroneous system parameter measurement, controller 702 updates system settings so that port 712 can provide the third power budget value to the device 708.

Figure 9:
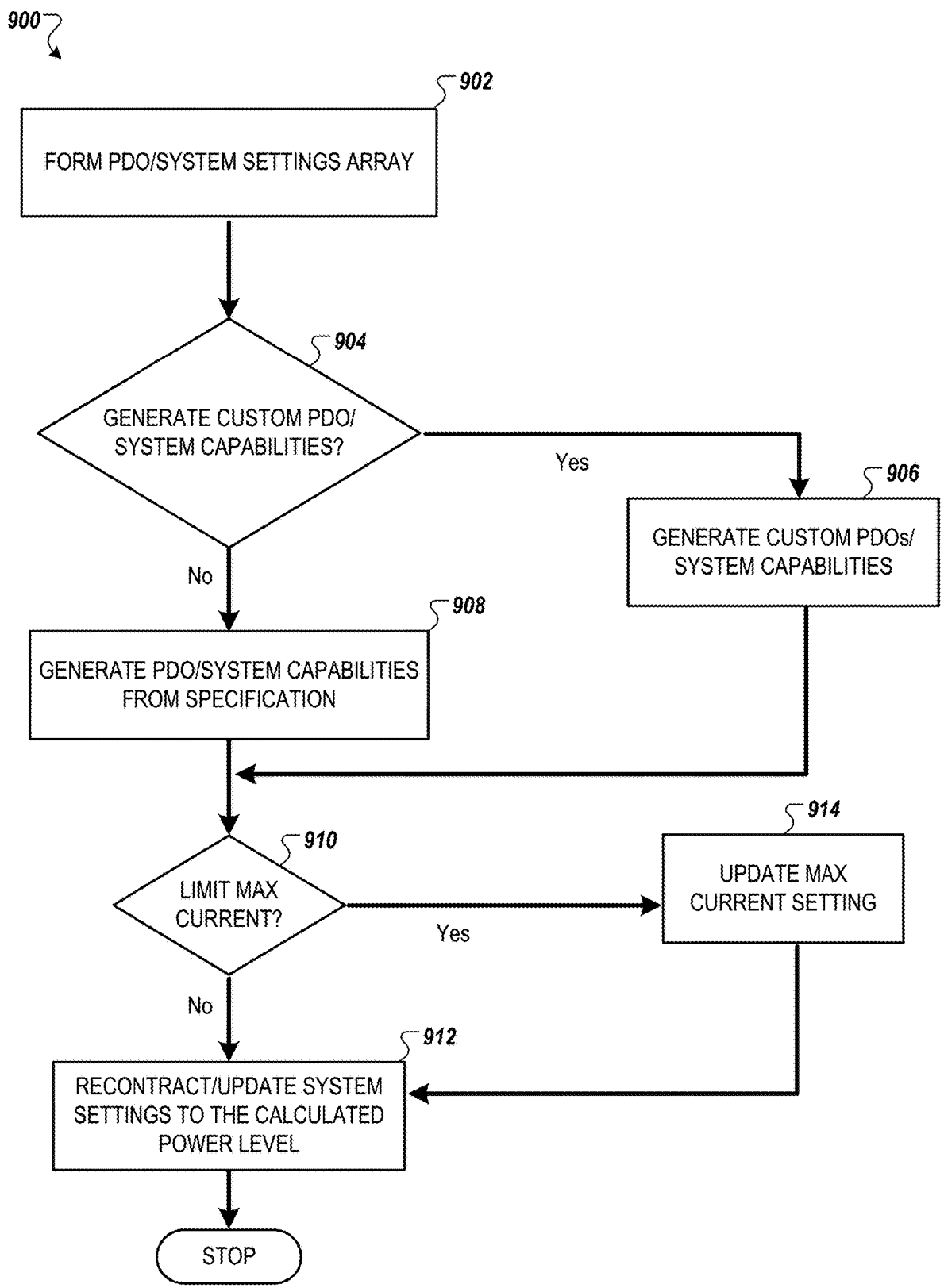
FIG. 9 is a flow diagram of a method for updating system capabilities according to one embodiment.

FIG. 9 is a flow diagram of a method 900 for updating system capabilities according to one embodiment. The method 900 may be performed by processing logic that comprises hardware (e.g., circuitry, dedicated logic, programmable logic, microcode, etc.), software, firmware, or a combination thereof. In one embodiment, the method 900 may be performed by any of the processing devices described herein. In one embodiment, the method 900 is performed by processing logic of a USB controller such as USB controller 102 of FIG. 1. In another embodiment, the method 900 is performed by controller 702 of FIG. 7 and FIG. 8. In one embodiment, the USB controller executes a firmware algorithm that performs the following operations. In another embodiment, the USB controller has embedded code or logic and is configured to execute instructions to perform the following operations. The method 900 may be performed when a power budget level is set or specified for a port. The USB controller sets a power setting of the port when a system operating condition changes, for example as described in reference to FIG. 7 and FIGS. 8A-8D. The USB controller can determine a first system operating condition corresponding to a first power level by obtaining data for one or more system parameters. Then the USB controller can obtain additional data for the one or more system parameters, and determine a second operating condition corresponding to a second power level. In one embodiment, the USB controller determines that the first operating condition and the second operating condition are the same, and the USB controller does not update a power setting of the system. In another embodiment, the USB controller determines that the first operating condition and the second operating condition are different and the USB controller performs method 900 to set the power setting of the system to the second power level.

Referring back to FIG. 9, the method 900 begins by the USB controller forming a PDO or system settings array (block 902). In one embodiment, the system can form a list of voltage and current levels that it can support to achieve the required power level. In other embodiments, the system has stored and retrieves the list. The PDO informs a sink device connect to the port about the port's capabilities to provide power. In one embodiment, the USB controller updates a PDO voltage. In another embodiment, the USB controller updates a PDO current. The sink device can request a power from the port by sending a requested data object (RDO). In one embodiment, the sink device sends an RDO voltage. In another embodiment, the sink device sends and RDO current. In one embodiment, the second power level is a full power level (e.g., a maximum amount of power that can be provided by the port to the sink device), and the USB controller updates the PDO to the full power level. In another embodiment, the second power level is less than the full power level and the USB controller updates the PDO to the second power level.

The USB controller determines whether or not it is required to generate a custom PDO (block 904). In one embodiment, the USB controller generates custom PDOs (block 906). In another embodiment, the USB controller generates PDOs from a specification (block 908). Based on the generated PDOs, the USB controller determines whether to limit a maximum current to be provided to the sink device (block 910). In one embodiment, the USB controller determines that it does not need to limit the maximum current, and updates the system settings to the calculated power level (e.g., the second power level, when the second power level is the full power level) (block 912) and the method 900 ends. In another embodiment, the USB controller determines that it does need to limit the maximum current (e.g., when the second power level is less than the full power level), and updates the maximum current setting by updating the PDO (block 914). Then the USB controller updates the system settings to the calculated power level (e.g., the second power level, when the second power level is less than the full power level) (block 912) and the method 900 ends.

Figure 10:
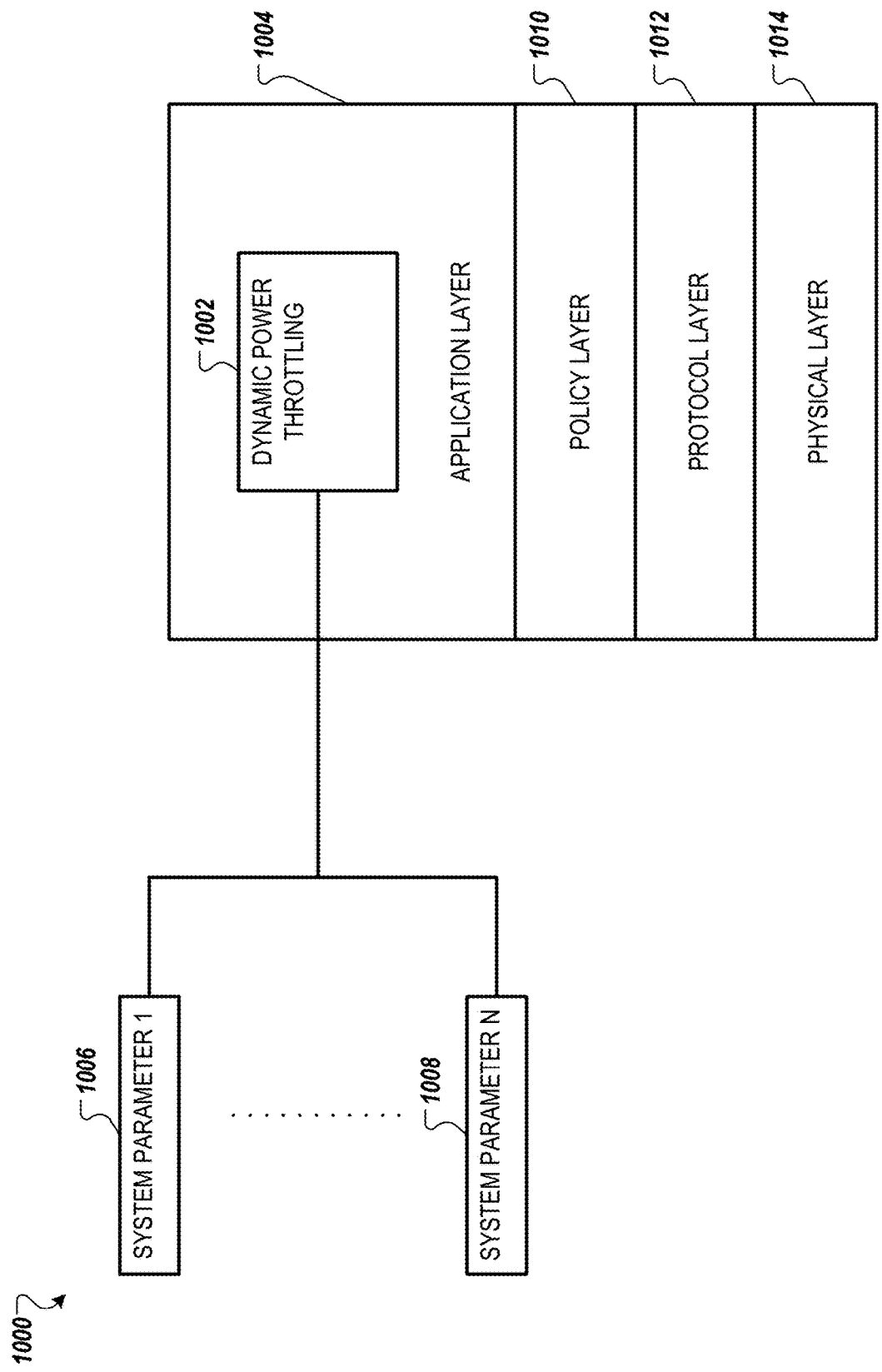
FIG. 10 is a block diagram of a system context and solution stack layout of dynamic power throttling according to one embodiment.

FIG. 10 is a block diagram of a system context and solution stack layout 1000 of dynamic power throttling according to one embodiment. Dynamic power throttling firmware algorithm 1002 sits in application layer 1004 of a subsystem. Dynamic power throttling firmware algorithm 1002 can be implement by and USB-C/PD system which requires a mechanism by which a total system power can be managed based on a current state of system parameters. A total number, N, of system parameters, ranging from system parameter 1 1006 to system parameter N 1008 are inputs to dynamic power throttling firmware algorithm 1002. The total number of system parameters can include any system stimuli or parameters, or any combination of system stimuli or parameters. Application layer 1004 can also be a solution layer. Application layer 1004 is an abstraction layer of a communication network, such as the communication network between a USB controller and a USB port, that specifies shared communication protocols and interface methods. Application layer 1004 depends on policy layer 1010. Policy layer 1010 depends on protocol layer 1012. Protocol layer 1012 depends on physical layer 1014. Physical layer 1014 can be responsible for transmission and reception of communication data. The application layer 1004 can configure and determine a prevalent operating condition. The policy layer 1010 can implement specification policies and can communicate to the port over the protocol layer 1012 and the physical layer 1014 (e.g., physical communication layer).

Figure 11:
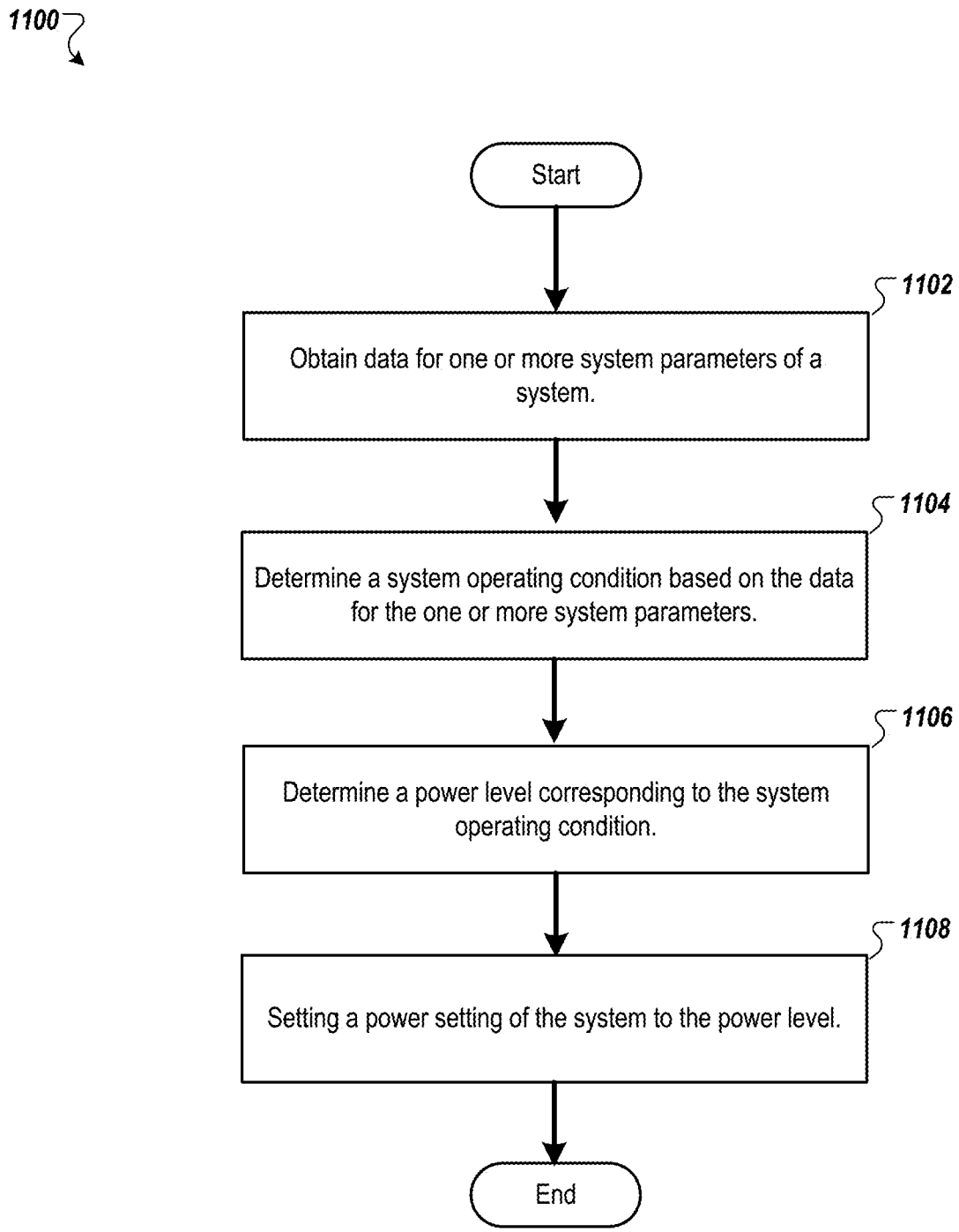
FIG. 11 is a flow diagram of a method for updating system capabilities according to one embodiment.

FIG. 11 is a flow diagram of a method 1100 for updating system capabilities according to one embodiment. The method 1100 may be performed by processing logic that comprises hardware (e.g., circuitry, dedicated logic, programmable logic, microcode, etc.), software, firmware, or a combination thereof. In one embodiment, the method 1100 may be performed by any of the processing devices described herein. In one embodiment, the method 1100 is performed by processing logic of a USB controller such as USB controller 102 of FIG. 1. In another embodiment, the method 900 is performed by controller 702 of FIG. 7 and FIG. 8. In one embodiment, the USB controller executes a firmware algorithm that performs the following operations. In another embodiment, the USB controller has embedded code or logic and is configured to execute instructions to perform the following operations.

Referring back to FIG. 11, the method 1100 starts by the processing logic obtaining data for one or more system parameters of a system (block 1102). In one embodiment, the system is a USB-C/PD system. In another embodiment, the system is a multiport USB-C/PD system. In other embodiments, the system can be a Micro-USB/PD system or other PD system. The one or more system parameters are at least one of a temperature, an input voltage, an output voltage, a cable loss metric, humidity, or the like. The processing logic determines a system operating condition based on the data for the one or more system parameters (block 1104). The system operating condition is a stress condition that is determined when supplying a full power level of the system can lead to inefficient operation of the system, damage to a port of the system, system malfunction, a blown fuse of the system, or the like. The processing logic determines a power level corresponding to the system operating condition (block 1106). The power level corresponds to the system operating condition. In one embodiment, the power level is a full power level, corresponding to a maximum amount of power that can be supplied by the port. In another embodiment, the power level is less than the full power level. The processing logic sets a power setting of the system to the power level (block 1108) and the method 1100 ends. The power level is specified as a power budget value. In one embodiment, the power budget value is a percentage of the full power level. In another embodiment, the power budget value is a fraction of the full power level. In another embodiment, the power budget value is an amount of power that can be supplied by the port. In another embodiment, the power budget value is a maximum power amount. As an example, in the case of a sink device, if the temperature increases, the method 1100 can cause the system to set a the system operating condition to an operating condition corresponding to a lower power budget value to prevent a malfunction of the sink device and to increase efficient at the higher temperature.

In another embodiment, to obtain the data, the processing logic obtains a temperature value associated with the system. The processing logic further obtains an input voltage value associated with the system. To determine the system operating condition, the processing logic compares the temperature value against a set of one or more temperature thresholds and the processing logic compares the input voltage value against a set of one or more voltage thresholds. The processing logic identifies the system operating condition based on comparisons of the temperature value against the set of one or more temperature thresholds and the input voltage against the set of one or more voltage thresholds. The processing logic determines the system operating condition as a most critical or least stable operating condition corresponding to the lowest power level. In one embodiment, the processing logic determines a first operating condition corresponding to a first power level for the temperature value and a second operating condition corresponding to a second power level, less than the first power level, for the input voltage value, and determines that the system operating condition is the second operating condition. In another embodiment, the processing logic determines a first operating condition corresponding to a first power level for the temperature value and a second operating condition corresponding to a second power level, greater than the first power level, for the input voltage value, and determines that the system operating condition is the first operating condition.

In another embodiment, to obtain the data, the processing logic obtains a first value associated with a first parameter of the one or more system parameters. To determine the system operating condition, the processing logic determines a first operating condition based on the first value. The first operating condition corresponds to a first power level. The system operating condition is the first operating condition.

In another embodiment, to obtain the data, the processing logic obtains a first value associated with a first parameter of the one or more system parameters. The processing logic obtains a second value associated with a second parameter of the one or more system parameters. To determine the system operating condition, the processing logic determines a first operating condition based on the first value and a second operating condition based on the second value. The first operating condition corresponds to a first power level and the second operating condition corresponds to a second power level. In one embodiment, the processing logic determines that the second power level is less than the first power level and the processing logic selects the second operating condition as the system operating condition. In another embodiment, the processing logic determines that the first power level is less than the second power level and the processing logic selects the first operating condition as the system operating condition. In a further embodiment, the processing logic obtains a third value associated with a third parameter of the one or more system parameters. The processing logic determines a third operating condition, corresponding to a third power level, based on the third value. In one embodiment, the processing logic determines that the third power level is less than the second power level and the first power level, and the processing logic selects the third operating condition as the system operating condition. In another embodiment, the processing logic determines that the second power level is less than the first power level and the third power level, and the processing logic selects the second operating condition as the system operating condition. In another embodiment, the processing logic determines that the first power level is less than the third power level and the second power level, and the processing logic selects the first operating condition as the system operating condition.

In another embodiment, the processing logic obtains data corresponding to the one or more system parameters. The processing logic determines that the system operating condition is a first system operating condition, corresponding to a first power level, based on the data. The processing logic updates a port budget value of the port to a first port budget value corresponding to the first power level. The processing logic obtains additional data for the one or more system parameters. In one embodiment, the processing logic obtains the additional data at a later instance of time. In another embodiment, the processing logic obtains the additional data when it detects a change in a value for the one or more system parameters. The processing logic determines a second system operating condition based on the additional data. The processing logic determines a second power level corresponding to the second system operating condition. The processing logic determines that the first system operating condition and the second system operating condition are different. The processing logic updates the system operating condition to the second system operating condition. The processing logic sets the power setting of the system to the second power level. In one embodiment, the second power level is the full power level, and the processing logic increases the power setting of the port to the full power level. In another embodiment, the second power level is less than the full power level, and the processing logic changes the power setting of the port to the second power level.

In a further embodiment, when the processing logic determines that the first system operating condition and the second system operating condition are different, the processing logic checks if the difference is valid. When the process logic detects that the second system operating condition is different from the first system operating condition, the processing logic resamples the additional data for the one or more system parameters and determines a corresponding operating condition. If the corresponding operating condition is the same as the second system operating condition, the processing logic determines that the difference (between the first system operating condition and the second system operating condition) is valid and the processing logic updates the system operating condition to the second system operating condition.

In another embodiment, the processing logic obtains a first value associated with a parameter of the one or more system parameters. The processing logic determines a first operating condition based on the first value. The processing logic sets an operating condition of the parameter as the first operating condition. The first operating condition corresponds to a first power level. The processing logic obtains a second value associated with the parameter. The processing logic determines a second operating condition, different than the first operating condition, based on the second value. The processing logic checks if the difference is valid. The processing logic compares the second value with the first value. In one embodiment, the second value is different than the first value by more than a threshold amount, and the processing logic determines that the difference (between the first value and the second value) is a result of an erroneous measurement, and the processing logic does not update the operating condition of the parameter to the second operating condition. In another embodiment, the processing logic determines that the difference is less than the threshold amount and the processing logic determines that the difference is valid and updates the operating condition to the second operating condition. In another embodiment, the processing logic determines that the difference is equal to the threshold amount, and the processing logic determines that the difference is a result of an erroneous measurement, and the processing logic does not update the operating condition of the parameter to the second operating condition. In another embodiment, the processing logic determines that the difference is equal to the threshold amount and the processing logic determines that the difference is valid and updates the operating condition to the second operating condition.

In another embodiment, the processing logic may operate the dynamic power throttling algorithm on a controller which is external to the system. In another embodiment, the external controller which monitors the one or more system parameters sends the power level or power setting over a communication channel to the controller of the system. In another embodiment the processing logic operates on the controller of the system and monitors one system parameter. The processing logic can proceed by incrementally adding new parameters to be monitored.

Figure 12:
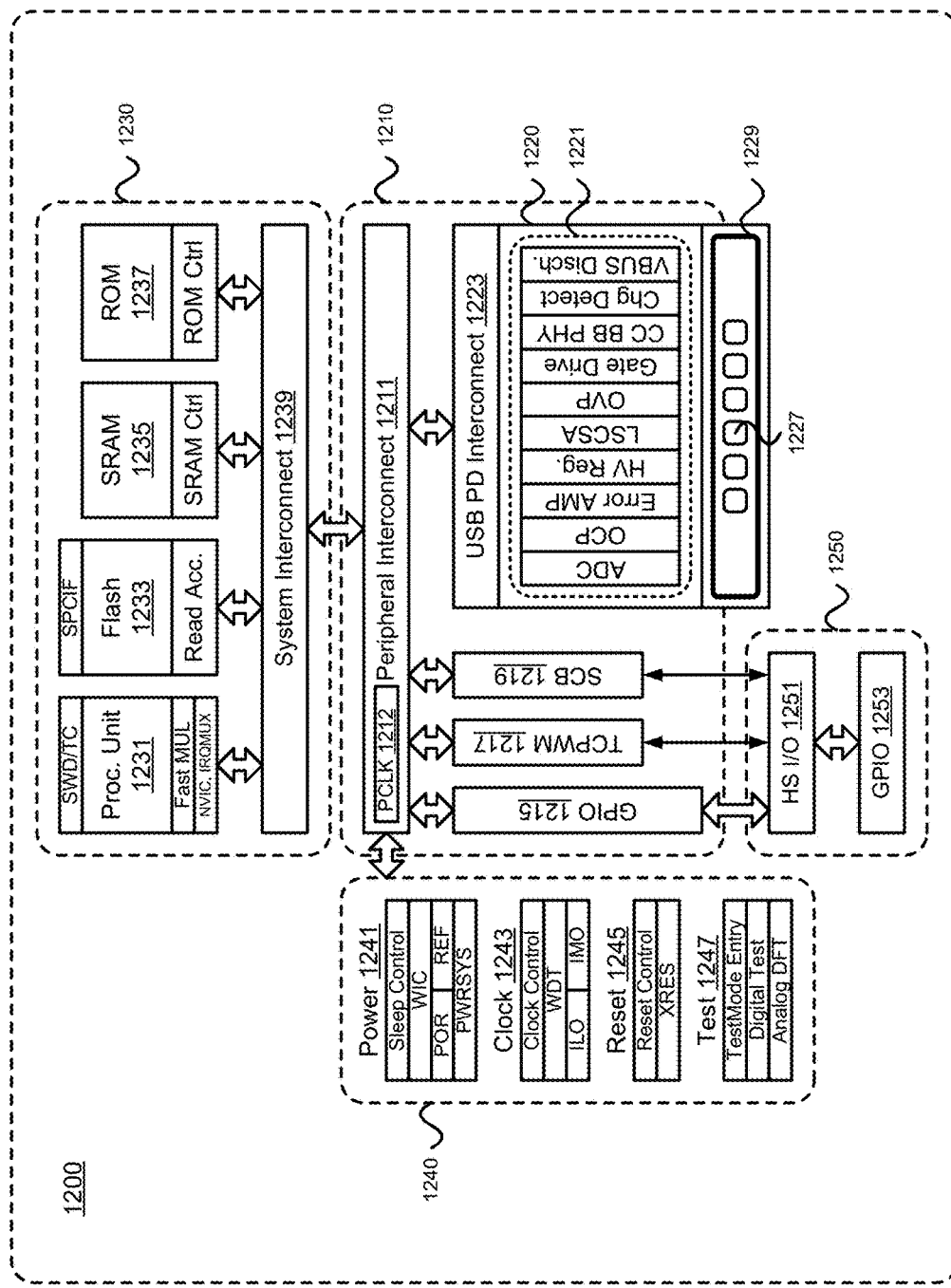
FIG. 12 is a block diagram illustrating a system for a USB device for use in USB power delivery in accordance with some embodiments.

FIG. 12 is a block diagram illustrating a system 1200 for a USB device for use in USB power delivery in accordance with some embodiments. System 1200 may include a peripheral subsystem 1210 including a number of components for use in USB Power Delivery (USB-PD). Peripheral subsystem 1210 may include a peripheral interconnect 1211 including a clocking module, peripheral clock (PCLK) 1212 for providing clock signals to the various components of peripheral subsystem 1210. Peripheral interconnect 1211 may be a peripheral bus, such as a single-level or multi-level advanced high-performance bus (AHB), and may provide a data and control interface between peripheral subsystem 1210, central processing unit (CPU) subsystem 1230, and system resources 1240. Peripheral interconnect 1211 may include controller circuits, such as direct memory access (DMA) controllers, which may be programmed to transfer data between peripheral blocks without input by, control of, or burden on CPU subsystem 1230. In some embodiments, CPU subsystem 1230 can perform the functionality of a controller for dynamic power throttling, such as controller 102 of FIG. 1 or controller 702 of FIG. 7 and FIGS. 8A-8D.

The peripheral interconnect 1211 may be used to couple components of peripheral subsystem 1210 to other components of system 1200. Coupled to peripheral interconnect 1211 may be a number of general purpose input/outputs (GPIOs) 1215 for sending and receiving signals. GPIOs 1215 may include circuits configured to implement various functions such as pull-up, pull-down, input threshold select, input and output buffer enabling/disable, single multiplexing, etc. Still other functions may be implemented by GPIOs 1215. One or more timer/counter/pulse-width modulator (TCPWM) 1217 may also be coupled to the peripheral interconnect and include circuitry for implementing timing circuits (timers), counters, pulse-width modulators (PWMs) decoders, and other digital functions that may operate on I/O signals and provide digital signals to system components of system 1200. Peripheral subsystem 1210 may also include one or more serial communication blocks (SCBs) 1219 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 1210 may include a USB power delivery subsystem 1220 coupled to the peripheral interconnect and comprising a set of USB-PD modules 1221 for use in USB power delivery. USB-PD modules 1221 may be coupled to the peripheral interconnect 1211 through a USB-PD interconnect 1223. USB-PD modules 1221 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 1200; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 1221 may also include a charger detection module for determining that a charging circuit is present and coupled to system 1200 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 1220 may also include pads 1227 for external connections and electrostatic discharge (ESD) protection circuitry 1229, which may be required on a Type-C port. USB-PD modules 1221 may also include a bi-directional communication module for supporting bi-directional communications with another controller, such as between a primary-side controller and a secondary-side controller of a flyback converter.

GPIO 1215, TCPWM 1217, and SCB 1219 may be coupled to an input/output (I/O) subsystem 1250, which may include a high-speed (HS) I/O matrix 1251 coupled to a number of GPIOs 1253. GPIOs 1215, TCPWM 1217, and SCB 1219 may be coupled to GPIOs 1253 through HS I/O matrix 1251.

System 1200 may also include a CPU subsystem 1230 for processing commands, storing program information, and data. CPU subsystem 1230 may include one or more processing units 1231 for executing instructions and reading from and writing to memory locations from a number of memories. Processing unit 1231 may be a processor suitable for operation in an integrated circuit (IC) or a system-on-chip (SOC) device. In some embodiments, processing unit 1231 may be optimized for low-power operation with extensive clock gating. In this embodiment, various internal control circuits may be implemented for processing unit operation in various power states. For example, processing unit 1231 may include a wake-up interrupt controller (WIC) configured to wake the processing unit up from a sleep state, allowing power to be switched off when the IC or SOC is in a sleep state. CPU subsystem 1230 may include one or more memories, including a flash memory 1233, and static random access memory (SRAM) 1235, and a read-only memory (ROM) 1237. Flash memory 1233 may be a non-volatile memory (NAND flash, NOR flash, etc.) configured for storing data, programs, and/or other firmware instructions. Flash memory 1233 may include a read accelerator and may improve access times by integration within CPU subsystem 1230. SRAM 1235 may be a volatile memory configured for storing data and firmware instructions accessible by processing unit 1231. ROM 1237 may be configured to store boot-up routines, configuration parameters, and other firmware parameters and settings that do not change during operation of system 1200. SRAM 1235 and ROM 1237 may have associated control circuits. Processing unit 1231 and the memories may be coupled to a system interconnect 1239 to route signals to and from the various components of CPU subsystem 1230 to other blocks or modules of system 1200. System interconnect 1239 may be implemented as a system bus such as a single-level or multi-level AHB. System interconnect 1239 may be configured as an interface to couple the various components of CPU subsystem 1230 to each other. System interconnect 1239 may be coupled to peripheral interconnect 1211 to provide signal paths between the components of CPU subsystem 1230 and peripheral subsystem 1210.

System 1200 may also include a number of system resources 1240, including a power module 1241, a clock module 1243, a reset module 1245, and a test module 1247. Power module 1241 may include a sleep control module, a wake-up interrupt control (WIC) module, a power-on-reset (POR) module, a number of voltage references (REF), and a PWRSYS module. In some embodiments, power module 1241 may include circuits that allow system 1200 to draw and/or provide power from/to external sources at different voltage and/or current levels and to support controller operation in different power states, such as active, low-power, or sleep. In various embodiments, more power states may be implemented as system 1200 throttles back operation to achieve a desired power consumption or output. Clock module 1243 may include a clock control module, a watchdog timer (WDT), an internal low-speed oscillator (ILO), and an internal main oscillator (IMO). Reset module 1245 may include a reset control module and an external reset (XRES) module. Test module 1247 may include a module to control and enter a test mode as well as testing control modules for analog and digital functions (digital test and analog DFT).

System 1200 may be implemented in a monolithic (e.g., single) semiconductor die. In other embodiments, various portions or modules of system 1200 may in implemented on different semiconductor dies. For example, memory modules of CPU subsystem 1230 may be on-chip or separate. In still other embodiments, separate-die circuits may be packaged into a single multi-chip module, or remain separate and disposed on a circuit board (or in a USB cable connector) as separate elements.

System 1200 may be implemented in a number of application contexts to provide USB-PD functionality thereto. In each application context, an IC controller or SOC implementing system 1200 may be disposed and configured in an electronic device (e.g., a USB-enabled device) to perform operations in accordance with the techniques described herein. In one example embodiment, a system 1200 may be disposed and configured in a personal computer (PC) power adapter for a laptop, a notebook computer, etc. In another example embodiment, system 1200 may be disposed and configured in a power adapter (e.g., a wall charger) for a mobile electronic device (e.g., a smartphone, a tablet, etc.). In another example embodiment, system 1200 may be disposed and configured in a wall socket that is configured to provide power over USB Type-A and/or Type-C port(s). In another example embodiment, system 1200 may be disposed and configured in a car charger that is configured to provide power over USB Type-A and/or Type-C port(s). In yet another example embodiment, system 1200 may be disposed and configured in a power bank that can get charged and then provide power to another electronic device over a USB Type-A or Type-C port. In other embodiments, a system like system 1200 may be configured with the power switch gate control circuitry described herein and may be disposed in various other USB-enabled electronic or electromechanical devices.

It should be understood that a system, like system 1200 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 1200 should be regarded in an illustrative rather than a restrictive sense.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining," "determining," "setting," "comparing," "identifying," "selecting," "setting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
obtaining, by a USB Type-C Power Delivery (USB-C/PD) controller, data for one or more system parameters of a system, wherein the data comprises a first value associated with a first type of parameter of the one or more parameters, a second value associated with a second type of parameter of the one or more parameters, and a third value associated with a third parameter of the one or more parameters, wherein each of the first type of parameter and the second type of parameter is one of a temperature, an input voltage, a cable loss metric, humidity, or an output voltage;
determining, by the USB-C/PD controller, a system operating condition by:
determining a first operating condition from the first type of parameter, the first operating condition being based on the first value and corresponding to a first power level;
determining a second operating condition from the second type of parameter, the second type of parameter being different than the first type of parameter, and the second operating condition being based on the second value and corresponding to a second power level; and
determining that the second operating condition corresponds to a power level that is less than a power level that the first operating condition corresponds to, and selecting the second operating condition as the system operating condition in response;
setting, by the USB-C/PD controller, a power setting of the system to the second power level corresponding to the system operating condition, the second power level being a non-zero power level that is less than a full power level of the system;
determining a third operating condition from the third parameter, the third operating condition being based on the third value and corresponding to a third power level that is lower than the first power level and the second power level;
changing the system operating condition to the third operating condition in response; and
changing the power setting of the system from the second power level to the third power level, the third power level being a non-zero power level.

2. The method of claim 1, wherein the one or more system parameters is at least one of the temperature, the input voltage, the cable loss metric, the humidity, or the output voltage.

3. The method of claim 1, wherein:
obtaining the data comprises obtaining a temperature value associated with the system; and
determining at least one of the first operating condition or the second operating condition further comprises:
comparing the temperature value against a set of one or more temperature thresholds; and
identifying the at least one of the first operating condition or the second operating condition based on a comparison of the temperature value against the set of one or more temperature thresholds.

4. The method of claim 3, wherein:
obtaining the data further comprises obtaining an input voltage value associated with the system; and
determining the at least one of the first operating condition or the second operating condition further comprises:
comparing the input voltage value against a set of one or more voltage thresholds; and
identifying the at least one of the first operating condition or the second operating condition based on comparisons of the temperature value against the set of one or more temperature thresholds and of the input voltage value against the set of one or more voltage thresholds.

5. The method of claim 1, wherein:
obtaining the data comprises:
obtaining the first value associated with the first type of parameter of the one or more system parameters; and
obtaining the second value associated with the second type of parameter of the one or more system parameters.

6. The method of claim 1, wherein:
obtaining the data comprises:
obtaining the first value associated with the first type of parameter of the one or more system parameters;
obtaining the second value associated with the second type of parameter of the one or more system parameters; and
obtaining the third value associated with the third parameter of the one or more system parameters.

7. The method of claim 1, wherein:
obtaining the data further comprises obtaining the third value associated with the first type of parameter of the one or more system parameters; and
determining the system operating condition comprises determining that the third value remains constant for a threshold amount of time and determining the third operating condition based on the third value, the third operating condition corresponding to the third power level that is less than the second power level, wherein the system operating condition is the third operating condition.

8. The method of claim 1, wherein the second power level is specified as a power budget value, the power budget value being at least one of a percentage of the full power level, a fraction of the full power level, or a maximum power amount.

9. The method of claim 1, further comprising:
obtaining, by the USB-C/PD controller, additional data for the one or more system parameters;
determining, by the USB-C/PD controller, a second system operating condition based on the additional data;
determining, by the USB-C/PD controller, a fourth power level corresponding to the second system operating condition, the fourth power level being different than the second power level; and
setting, by the USB-C/PD controller, the power setting of the system to the fourth power level.

10. The method of claim 9, wherein the fourth power level is the full power level.

11. The method of claim 1, wherein setting the power setting comprises updating at least one of a power data object (PDO) voltage, a PDO current, a requested data object (RDO) voltage, or a RDO current associated with a device connected to a USB-C/PD port of the system.

12. A system comprising:
a USB Type-C Power Delivery (USB-C/PD) port;
a controller operatively coupled to the USB-C/PD port, wherein the controller is configured to:
obtain data for one or more system parameters of a system, wherein the data comprises a first value associated with a first type of parameter of the one or more system parameters, a second value associated with a second type of parameter of the one or more system parameters, and a third value associated with a third parameter or the one or more system parameters, wherein each of the first type of parameter and the second type of parameter is one of a temperature, an input voltage, a cable loss metric, humidity, or an output voltage;
determine a system operating condition by:
determining a first operating condition from the first type of parameter, the first operating condition being based on the first value and corresponding to a first power level;
determining a second operating condition from the second type of parameter, the second type of parameter being different than the first type of parameter, and the second operating condition being based on the second value and corresponding to a second power level; and
determining that the second operating condition corresponds to a power level that is less than a power level that the first operating condition corresponds to, and selecting the second operating condition as the system operating condition in response;
set a power setting of the system to the second power level corresponding to the system operating condition, the second power level being a non-zero power level that is less than a full power level of the system;
determine a third operating condition from the third parameter, the third operating condition being based on the third value and corresponding to a third power level that is lower than the first power level and the second power level;
change the system operating condition to the third operating condition in response; and
change the power setting of the system from the second power level to the third power level, the third power level being a non-zero power level.

13. The system of claim 12, further comprising a first sensor coupled to the controller, the first sensor to provide the first value associated with the first type of parameter of the one or more system parameters.

14. The system of claim 13, further comprising a second sensor coupled to the controller, the second sensor to provide the second value associated with the second type of parameter of the one or more system parameters.

15. The system of claim 12, further comprising:
a power converter coupled to a power source that supplies a system power at the full power level; and
a power field effect transistor (FET) coupled between the power converter and the USB-C/PD port, the power FET controlled by the controller.

16. The system of claim 15, wherein the power converter is a first direct-current to direct-current (DC-DC) converter of a power adapter, wherein the power adapter is part of a headunit of an automobile, a rear-seat entertainment system of the automobile, or a rear-seat charger of the automobile.

17. The system of claim 15, wherein the power converter is a first alternating-current to direct-current (AC-DC) converter of a power adapter, wherein the power adapter is part of a wall charger, a power hub, or a power bank.

18. A USB Type-C Power Delivery (USB-C/PD) controller comprising:
a first terminal coupled to a first USB-C/PD port;
a set of terminals to receive data for one or more system parameters of a system, wherein the data comprises a first value associated with a first type of parameter of the one or more system parameters, a second value associated with a second type of parameter of the one or more system parameters, and a third value associated with a third parameter of the one or more system parameters, wherein each of the first type of parameter and the second type of parameter is one of a temperature, an input voltage, a cable loss metric, humidity, or an output voltage; and
a processing circuit coupled to the first terminal and the set of terminals, the processing circuit to:
determine a system operating condition by:
determining a first operating condition from the first type of parameter, the first operating condition being based on the first value and corresponding to a first power level;
determining a second operating condition from the second type of parameter, the second type of parameter being different than the first type of parameter, and the second operating condition being based on the second value and corresponding to a second power level; and
determining that the second operating condition corresponds to a power level that is less than a power level that the first operating condition corresponds to, and selecting the second operating condition as the system operating condition in response;
set a power setting of the system to the second power level corresponding to the system operating condition, the second power level being a non-zero power level that is less than a full power level of the system
determine a third operating condition from the third parameter, the third operating condition being based on the third value and corresponding to a third power level that is lower than the first power level and the second power level;
change the system operating condition to the third operating condition in response; and
change the power setting of the system from the second power level to the third power level, the third power level being a non-zero power level.

19. The USB-C/PD controller of claim 18, wherein the processing circuit is to:
receive, via the set of terminals, the first value associated with the first type of parameter of the one or more system parameters; and
receive, via the set of terminals, the second value associated with the second type of parameter of the one or more system parameters.

20. The USB-C/PD controller of claim 18, wherein the power level is specified as a power budget value, the power budget value being at least one of a percentage of the full power level, a fraction of the full power level, or a maximum power amount.

21. The USB-C/PD controller of claim 18, wherein the processing circuit is further to:
receive, via the set of terminals, additional data for the one or more system parameters;
determine a system operating condition based on the additional data;

determine a fourth power level corresponding to the system operating condition, the fourth power level being different than the second power level; and
set the power setting of the system to the fourth power level.

\* \* \* \* \*